United States Patent
Fujimoto et al.

(10) Patent No.: US 6,385,681 B1
(45) Date of Patent: May 7, 2002

(54) DISK ARRAY CONTROL DEVICE WITH TWO DIFFERENT INTERNAL CONNECTION SYSTEMS

(75) Inventors: Kazuhisa Fujimoto, Kodaira; Atsushi Tanaka, Urawa; Akira Fujibayashi, Kokubunji; Hiroki Kanai, Higashiyamto; Nobuyuki Minowa, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/358,374

(22) Filed: Jul. 21, 1999

(30) Foreign Application Priority Data

Sep. 18, 1998 (JP) .......................................... 10-264286

(51) Int. Cl.⁷ .............................................. G06F 13/40
(52) U.S. Cl. ...................................... 710/131; 710/129
(58) Field of Search ................................ 710/129–131; 711/1, 3, 4, 5, 112, 118, 147

(56) References Cited

U.S. PATENT DOCUMENTS

| | | | |
|---|---|---|---|
| 4,476,526 A | * 10/1984 | Dodd | 711/113 |
| 5,142,627 A | * 8/1992 | Elliot et al. | 710/5 |
| 5,335,352 A | * 8/1994 | Yanai et al. | 710/51 |
| 6,065,096 A | * 5/2000 | Day et al. | 711/114 |
| 6,094,728 A | * 7/2000 | Ichikawa et al. | 714/6 |

* cited by examiner

Primary Examiner—B. James Peikari
(74) Attorney, Agent, or Firm—Antonelli, Terry, Stout & Kraus, LLP

(57) ABSTRACT

A disk array control device which includes a plurality of channel interface (IF) units, a plurality of disk IF units, a cache memory unit, and a shared memory unit. The connection system between the plurality of channel IF units and plurality of disk IF units and the cache memory unit is different from the connection system between the plurality of channel IF units and plurality of disk IF units and the shared memory unit. In the invention the plurality of channel IF units and the plurality of disk IF units are connected via a selector to the cache memory unit, whereas the plurality of channel IF units and the plurality of disk IF units are directly connected to the shared memory unit with no selectors.

14 Claims, 17 Drawing Sheets

DISK ARRAY CONTROL DEVICE WITH TWO DIFFERENT INTERNAL CONNECTION SYSTEMS

BACKGROUND OF THE INVENTION

1. Field of the Invention

The present invention relates to control devices of disk array devices for storing data in a plurality of magnetic disk devices.

2. Description of the Related Art

In view of the fact that the input/output (I/O) performance or throughput of a disk subsystem (referred to as "subsystem" hereinafter) is less by approximately three to four orders of magnitude than the I/O throughput of main memories of computers with semiconductor memory devices as their storage media, attempts have conventionally been made to reduce this difference. Namely, attempts have been made to improve the I/O throughput of the subsystem. One prior known approach to improving the subsystem's I/O throughput is to use a system, called "disk array," for constituting the subsystem from a plurality of magnetic disk devices such as fixed or "hard" disk drives (HDDS) adaptable for use in storing data in such plurality of HDDS.

FIG. 2 shows an arrangement of one prior art disk array. This includes a plurality of channel interface (IF) units 11 for execution of data transmission between a host computer 50 and a disk array control device 2, a plurality of disk IF units 12 for execution of data transfer between HDDs 20 and the disk array control unit 2, a cache memory unit 14 for temporality storing data of HDDs 20, and a shared memory unit 15 for storing control information as to the disk array controller 2 (for example, information concerning data transfer control between the channel and disk IF units 11, 12 and the cache memory unit 14), wherein the cache memory unit 14 and shared memory unit 15 are arranged so that these are accessible from all of the channel IF units 11 and disk IF units 12. With this disk array, the channel and disk IF units 11 and disk IF units 12 are connected to the shared memory unit 15 on a one-to-one basis; similarly, the channel IF units 11 and disk IF units 12 are connected one by one to the cache memory unit 14. This connection form is called the star connection.

The channel IF unit 11 has an interface for connection with the host computer 50 and also a microprocessor (not shown) for controlling input/output with respect to the host computer 50. The disk IF unit 12 has an interface for connection to the HDDs 20 and a microprocessor (not shown) for controlling input/output relative to HDDs 20. The disk IF units 12 also executes RAID functions.

FIG. 3 shows a configuration of another prior art disk array. It includes a plurality of channel IF units 11 for execution of data transfer between a host computer 50 and a disk array controller 3, a plurality of disk IF units 12 for execution of data transfer between HDDs 20 and the disk array controller 3, a cache memory unit 14 for temporality storing data of HDDs 20, and a shared memory unit 15 for storing control information as to the disk array controller 3 (e.g. information concerning data transfer control between the channel and disk IF units 11, 12 and the cache memory unit 14), wherein each of channel IF units 11 and disk IF units 12 is connected by a shared bus 130 to the shared memory unit 15 whereas each channel and disk IF unit 11, 12 is connected by a shared bus 131 to the cache memory unit 14. Such connection form is called the shared bus connection.

To render scalable the disk array's architectures, it is required that the disk IF units be additionally provided in accordance with the required number of disks being connected to the disk control device while increasingly providing the channel IF units within the disk array controller as per the required number of channels associated with a host computer(s). However, with the disk array controller of the shared bus connection form shown in FIG. 3, because it is impossible to change or modify the transfer ability of the once-mounted shared bus in accordance with the add-in provision of the channel IF units and disk IF units, it remains difficult to flexibly accommodate such add-in extended reconfiguration of the channel IF units and disk IF units.

With the shared bus connection form shown in FIG. 3, in the case of employing high-performance processors as the microprocessors provided in the channel IF units and those in the disk IF units, the shared bus's transfer ability becomes a bottle neck when compared to the performance of these processors, which leads to difficulty in keeping up with the growth of high-speed computer processor technology.

Further, in the shared bus connection form shown in FIG. 3, in cases where disturbance or operation failures occur at any one of the plurality of channel IF units (or a plurality of disk IF units) as connected to the shared bus, it is difficult to specify which one of the channel IF units (or, disk IF units) suffers from such trouble.

On the contrary, in the disk array controller of the star connection form shown in FIG. 2, it is possible to increase the internal path performance or throughput in a way proportional to the number of access paths being connected to either the shared memory unit or cache memory unit, which in turn makes it possible to increase the throughput of internal paths in accordance with the add-in reconfiguration of the channel and disk IF units or alternatively with the performance of processors used. In addition, as the one-to-one (star) connection is used between the channel IF and disk IF units and the cache memory unit or between the channel and disk IF units and the shared memory unit, it is easy to specify a channel IF unit (or disk IF unit) at which an operation failure was occurred.

In the disk array controller of the star connection form, increasing the number of those channel IF units or disk IF units as built therein would result in an increase in number of access paths between the channel and disk IF units and the cache memory unit and between the channel and disk IF units and the shared memory unit. Additionally, the throughput called for disk array control devices tends to further increase due to employment of high-speed channels, such as fiber channel, for connection between host computers and disk array controllers; in order to satisfy this need for improvement of throughput, it should be required to increase the number of access paths between the channel and disk IF units and the cache memory unit and between the former and the shared memory unit to thereby improve the internal path throughput.

However, the data amount of a single data segment or datum to be stored in the cache memory is much greater than the data amount of a single control information item being stored in the shared memory. One example is that in a disk control device as connected to a mainframe, a single datum being stored in the cache memory is several kilobytes (KB) or more or less (for example, 2 KB) whereas one control information item stored in the shared memory is several bytes or thereround (e.g. 4 bytes). Another example is that in disk control devices as connected to host computers of open architectures, a single datum as stored in the cache memory is several tens of byte (e.g. 64 bytes) whereas a single control information item stored in the shared memory is about several bytes (e.g. 4 bytes). Accordingly, the amount of data to be transferred between the channel and disk IF units and the cache memory unit is extremely greater than the data mount being transferred between the channel and disk IF units and the shared memory unit, which leads to a need for letting the data width of an access path between the channel and disk IF units and the cache memory unit be wider than the data width of an access path between the channel and disk IF units and the shared memory unit. For instance, the access path of the former is constituted from a 16-bit width bus whereas the latter is from a 4-bit width bus. For this reason, increasing the line number of access paths between the channel and disk IF units and the cache memory unit would result in creation of a problem of shortage of the pin number of an LSI(s) of the cache memory unit for connection of the access paths thereof. Additionally, in order to shorten the response time to the host computer of a disk array control device, it is also required to minimize a time taken to give access to the control information as stored in the shared memory unit.

SUMMARY OF THE INVENTION

It is therefore an object of the present invention to provide a disk array control device having high throughput and short response time which takes into consideration characteristics of data to be stored in a cache memory and shared memory and of access characteristics to these memories, along with a subsystem using the same.

It is another object of the invention to provide a disk array control device with access paths having high throughout between channel IF units and disk IF units and a cache memory unit and also with access paths having high throughout between such channel and disk IF units and a shared memory and with a short access time, and also a subsystem using the disk array controller.

To attain the foregoing objects, a disk array control device is provided which includes a plurality of channel interface units having an interface with a host computer, a plurality of disk interface units having an interface with a magnetic disk device, a cache memory unit for temporarily storing therein data being read/written with respect to said magnetic disk device, and a shared memory unit for storage of control information as to data transmission between the channel interface units and disk interface units and said cache memory unit, wherein each channel interface unit executes data transfer between the interface with the host computer and the cache memory unit whereas each disk interface unit executes data transfer between the interface with the magnetic disk device and the cache memory unit, characterized in that the connection form between said plurality of channel interface units and said plurality of disk interface units and said cache memory unit is different from the connection form between said plurality of channel interface units and said plurality of disk interface units and said shared memory unit.

Preferably, the plurality of channel interface units and said plurality of disk interface units are connected via a selector unit to said cache memory unit, while said plurality of channel interface units and said plurality of disk interface units are directly connected 15 via no selector unit to said shared memory unit respectively.

Also preferably, the plurality of channel interface units and said plurality of disk interface units are connected via one or more selector units to the cache memory unit, and the plurality of channel interface units and the plurality of disk interface units as well as said shared memory unit are connected to a common bus.

Also preferably, the plurality of channel interface units and said plurality of disk interface units are connected to said cache memory unit via an interconnection network using one or more switches whereas said plurality of channel interface units and said plurality of disk interface units are directly connected to said shared memory unit respectively.

These and other objects, features and advantages of the invention will be apparent from the following more particular description of preferred embodiments of the invention, as illustrated in the accompanying drawings.

DETAILED DESCRIPTION OF THE EMBODIMENT

Figure 1:
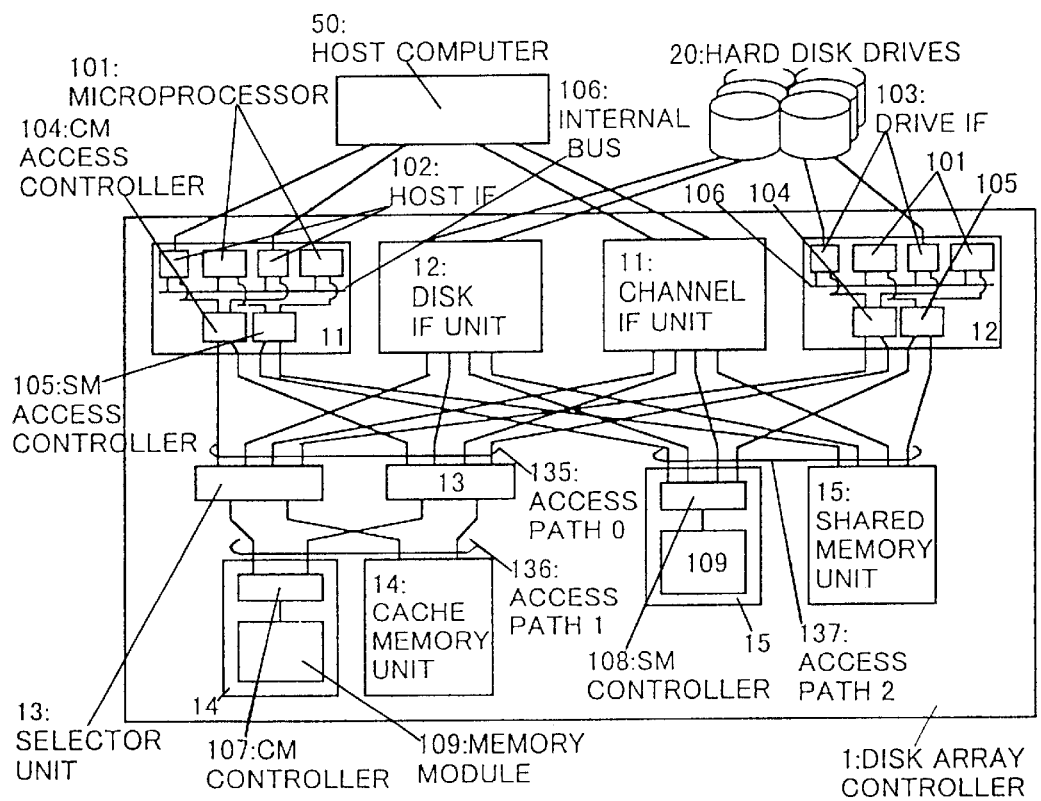
FIG. 1 is a diagram showing a configuration of a disk array control device in accordance with the present invention.

Some preferred embodiments of the present invention will be explained with reference to the accompanying drawings.
[Embodiment 1]
Referring now to FIG. 1, there is shown one embodiment of this invention.

A disk array control device 1 is arranged including two channel interface (IF) units 11 operatively associated with a host computer 50, two disk IF units 12 associated with a magnetic disk device 20 that has a group of multiple hard disk drives (HDDs), two selector units 13, two cache memory units 14, two common-use or "shared" memory units 15, an access path 0:135, an access path 1:136, and an access path 2:137.

The channel IF unit 11 has two host IFs 102 associated with the host computer 50, two microprocessors 101 for control of input/output with respect to the host computer 50, a cache memory (CM) access control unit 104 for controlling access to the cache memory units 14, and a shared memory (SM) access control unit 105 for controlling access to the shared memory units 15, and executes data transmission between the host computer 50 and the cache memory units 14 along with transmission of control information between the microprocessors 101 and the shared memory units 15. The microprocessors 101 and the host IFs 102 are connected together by an internal bus 106, whereas the CM access control unit 104 is directly connected to two host IFs 102. The SM access control unit 105 is directly connected to two microprocessors 101.

The disk IF unit 12 includes two drive IFs 103 associated with the magnetic disk device 20 having HDDs, two microprocessors 101 for controlling input/output with respect to the magnetic disk device 20, and a CM access control unit 104 for controlling access to the cache memory unit 14 and an SM access control unit 105 for controlling access to the shared memory unit 15, and executes data transfer between the magnetic disk device 20 and the cache memory units 14 along with transmission of control information between the microprocessors 101 and the shared memory units 15. The microprocessors 101 and drive IFs 103 are connected by an internal bus 106 whereas the CM access control unit 104 is directly connected to the two drive IFs 103. The SM access control unit 105 is directly connected to the two microprocessors 101. The disk IF unit also executes RAID functions.

The cache memory unit 14 has a cache memory (CM) controller 107 and a memory module 109, and temporarily stores therein data to be recorded on the magnetic disk device 20.

The shared memory unit 15 has a shared memory (SM) controller 108 and a memory module 109, for storing control information of the disk array controller 1 (for example, information as to data transfer control between the channel IF units and disk IF units and the cache memory units 14) and the like.

The two lines of access paths 0:135 are connected to the CM access control unit 104 and further connected to two different selector units 13 respectively. The two lines of access paths 1:136 are connected to the selector units 13 and further connected to two different CM controllers 107 respectively. Accordingly, two access paths 1:136 in total, one of which is from one of the two selector units and the other of which is from the remaining selector unit, are connected to the CM controller 107. With such an arrangement, two access routes are established from a single CM access control unit 104 toward a single CM controller 107. Thus, it becomes possible even where disturbance or trouble occurs at either an access path or selector unit 13 to get access to the cache memory units 14 by use of the remaining one of the access routes, which in turn makes it possible to improve the robustness against obstruction, also known as fault tolerance.

The two lines of access paths 2:137 are connected to the SM access control unit 105 and further connected to two different SM controllers respectively. Accordingly, there are connected to the SM controller 108 four lines of access paths 2:137 in total, which are selected on a one-per-IF basis—i.e. two of them are from two channel IF units 11 respectively while the other two are from two disk IF units 12 respectively. Although in this embodiment a single access path 2:137 was connected between a single SM access control unit 105 and a single SM controller 108, increasing this access path 2:137 up to two lines results in establishment of two access routes from one SM access control unit 105 to one SM controller 108, which in turn enables improvement of the robustness against operation failures (fault tolerance).

Connected to the selector unit 13 are the total number of four lines of access paths 0:135 as selected on a one-per-IF basis—namely, two of them are from the two channel IF units 11 respectively whereas the remaining two are from the two disk IF units 12 respectively. Additionally, the selector unit 13 is associated with two lines in total of access paths 1:136 as connected thereto, each of which is toward one of the two cache memory units 14.

As the above-stated path-number relationship is established between the access path 0:135 and access path 1:136, the selector unit 13 has a function of selecting for execution only two from among those requests from four lines of access paths 0:135 from the channel IF units 11 and disk IF units 12, which correspond to the number of the access paths 1:136 toward the cache memory units 14.

One significant feature of this embodiment lies in that the connection form between the channel and disk IF units 11, 12 and the cache memory units 14 is different from the connection form between the channel and disk IF units 11, 12 and the shared memory units 15e The reason for use of such configuration will be explained in conjunction with FIGS. 1–2.

Figure 2:
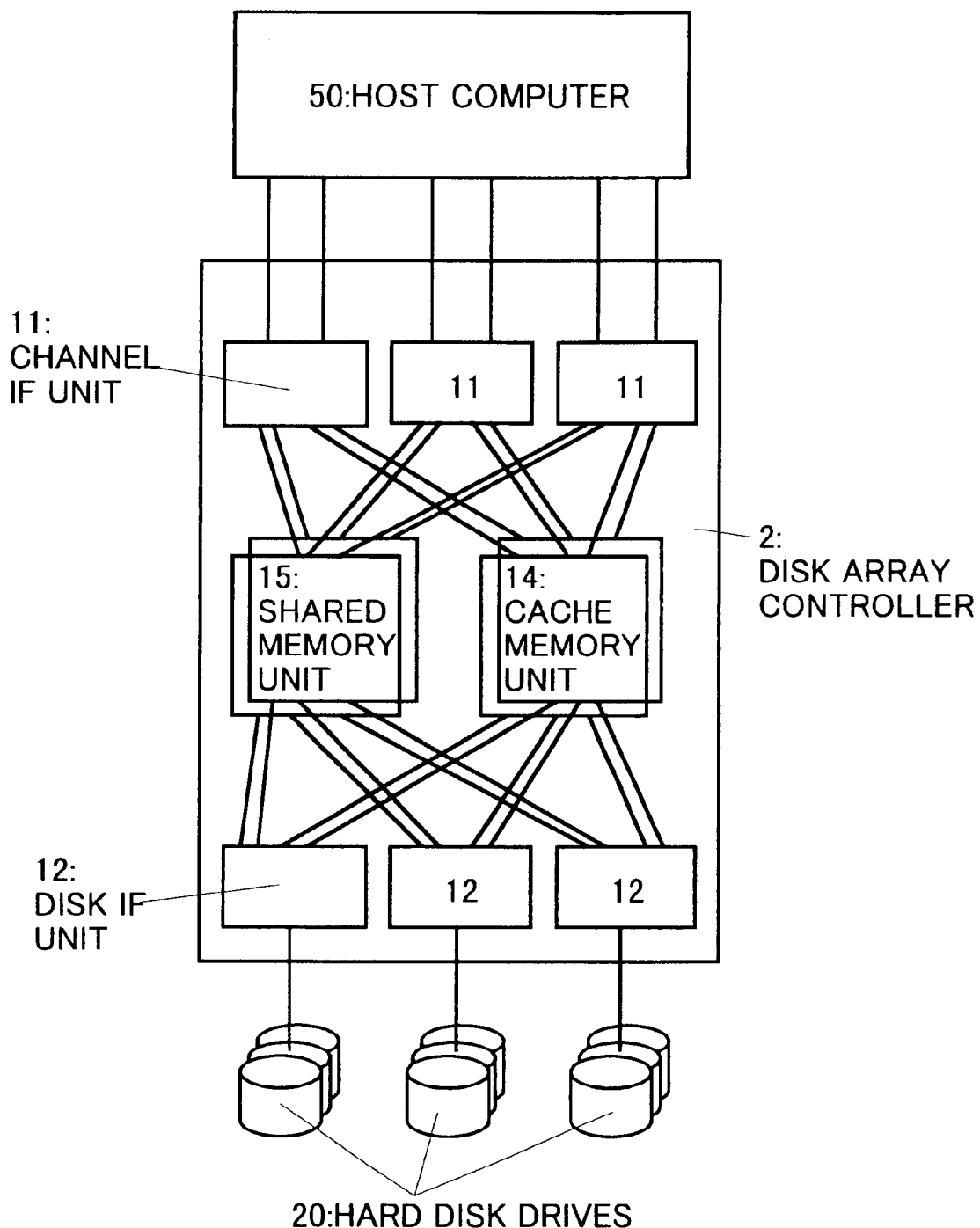
FIG. 2 is a diagram showing a configuration of one prior art disk array controller.
Figure 3:
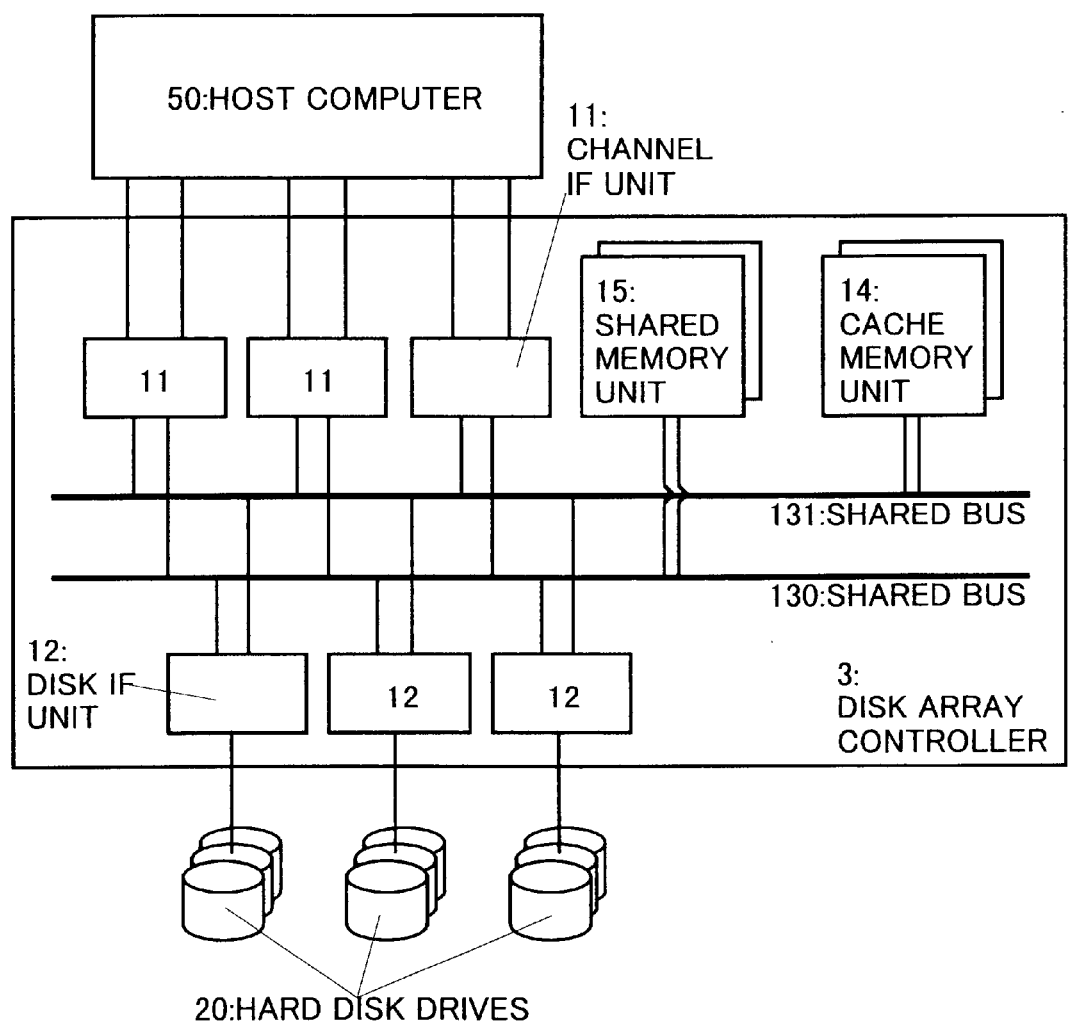
FIG. 3 is a diagram showing a configuration of another prior art disk array controller.

With a disk array control device 2 of the star connection form shown in FIG. 2, in the case of increasing the number of either the channel IF units 11 or disk IF units 12 as built in the disk array controller 2, the access buses will likewise increase in number between the channel and disk IF units 11, 12 and the cache memory units 14 and also between such IF units 11, 12 and the shared memory units 15. In addition, in the disk array controller 2 of star connection form, it is effective in order to improve the throughput that the access paths increase in number between the channel and disk IF units 11, 12 and the cache memory unit 14 and between the channel and disk IF units 11, 12 and the shared memory unit 15 to thereby improve the internal path performance or throughput.

However, the data amount of a single datum to be stored in cache memory units 14 is much greater than the data amount of a single control information item being stored in shared memory units 15. One example is that in a disk control device connected to a mainframe computer, a single datum to be stored in the cache memory units 14 is approximately a few kilobytes (e.g. 2 Kbytes) whereas a single control information item being stored in the shared memory units 15 is about several bytes (e.g. 4 bytes). Another example is that in a disk control device as connected to a host computer of open architectures, a single datum to be stored in the cache memory units 14 is about several tens of byte (for example, 64 bytes) whereas a single control information item being stored in the shared memory units 15 is about several bytes (e.g. 4 bytes). Accordingly, because the amount of data to be transferred between the channel and disk IF units 11, 12 and the cache memory units 14 is much greater than the data amount being transferred between these channel IF units 11, 12 and the shared memory units 15, it should be required that the data width of an access path between the channel and disk IF units 11, 12 and the cache memory units 14 be wider than the data width of an access path between the same IF units 11, 12 and the shared memory units 15. For instance, the access path of the former is constituted from a bus of 16-bit width whereas the latter is formed of a 4-bit width bus. Due to this, increasing the line number of access path between the channel and disk IF units 11, 12 and the cache memory units 14 can result in creation of a problem of either pin number shortage of an LSI of a cache memory controller within the cache memory unit 14 (this cache memory controller is not shown In FIG. 2) or pin number shortage of a connector at a package for mounting the cache memory units 14. Then, in this embodiment, as shown in FIG. 1, the channel IF units 11 and disk IF units 12 are connected via the selector units 13 to the cache memory units 14 to thereby reduce the required number of access paths as directly connected to the cache memory units 14.

On the other hand, as previously described, the data length of a single control information item to be stored in the shared memory unit 15 is extremely less than the data length of a single datum being stored in the cache memory unit 14 so that it is possible for the data width of an access path between the channel and disk IF units 11, 12 and the shared memory unit 15 to be less than or equal to half of the data width of an access path between these IF units 11, 12 and the cache memory unit 14. Consequently, even when increasing the number of paths for access to the shared memory unit 15, there will hardly occur any problems such as pin number shortage of the LSI of a shared memory controller (this shared memory controller is not illustrated in FIG. 2) within the shared memory unit.

In addition, in order to shorten a response time to the host computer 50 of the disk array controller 1, it is also required to maximally shorten an access time to the control information being stored in the shared memory unit 15. However, as done between the CM access control unit 104 and CM controller 107 shown in FIG. 1, if the SM access control unit 105 and SM controller 108 are connected together via a selector unit then it is no longer possible by overhead of processing tasks at such selector unit to shorten the access time to the control information as stored in the shared memory unit 15.

Then, with this embodiment, directly connecting the channel IF units 11 and disk IF units 12 to the shared memory units 15 with no selector units provided therebetween permits provision of a plurality of access paths between the channel and disk IF units 11, 12 and the shared memory unit 15 to thereby improve the throughput while eliminating processing overhead events at selector units for minimizing an access time to the shared memory units 15 from the channel IF units 11 and disk IF units 12.

It should be noted that although in this embodiment the selector units 13 and cache memory units 14 and shared memory units 15 are each doubly configured or "duplicated" in a viewpoint of fault tolerance enhancement, the aforementioned effects and advantages are obtainable without having to employ such duplexing scheme.

Figure 4:
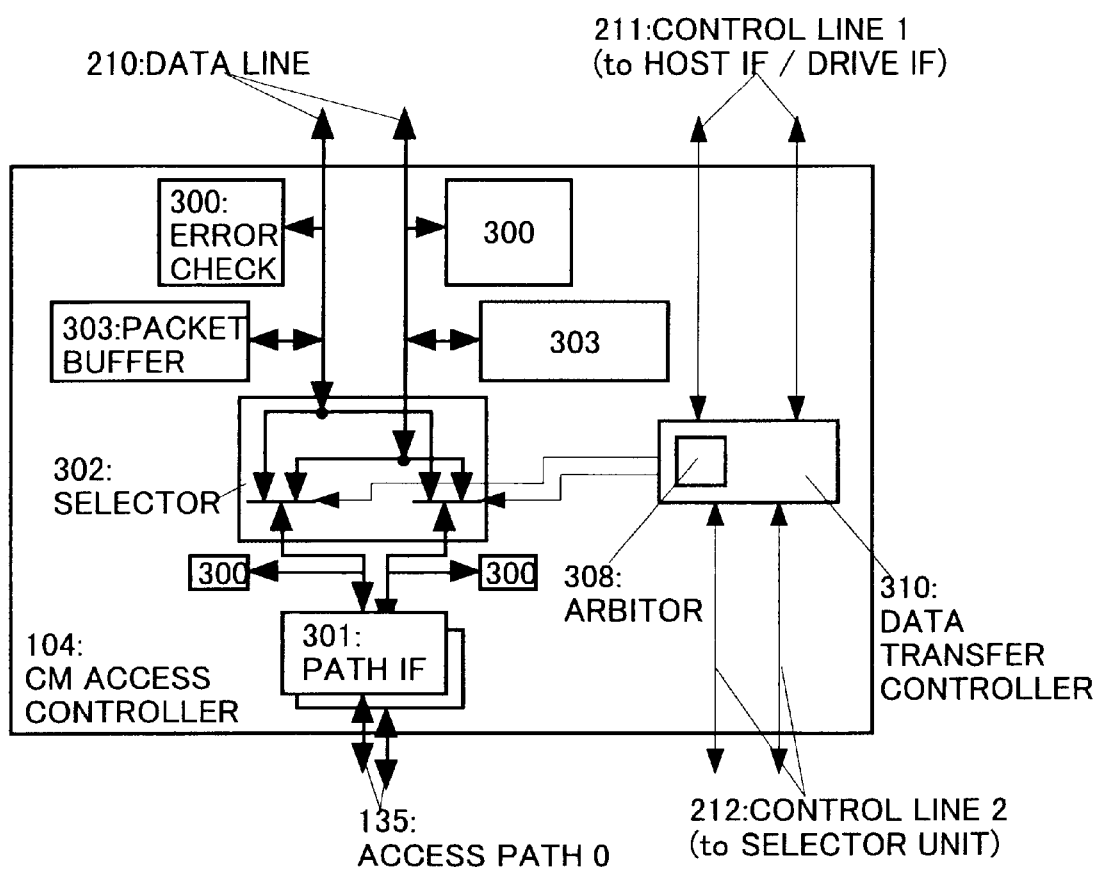
FIG. 4 is a diagram showing a configuration of a CM access control unit within the disk array controller in accordance with this invention.

FIG. 4 shows an internal configuration of the CM access control unit 104. The CM access control unit 104 has a selector 302, packet buffers 303 for temporal storage of an address and command as well as data, a path IF 301 associated with the access path 0:135 as coupled to the selector units 13, data error check units 300, and a data transfer control unit 310. Two ports of the selector 302 are connected by data lines 210 to either host IFs 102 or drive IFs 103. The other two ports of the selector 302 are connected to the path IF 301. The path IF 301 is connected by access paths 0:135 to the selector units 13. The data transfer control unit 310 is connected by control lines 1:211 to either the host IFs 102 or the drive IFs 103, and is connected by control lines 2:212 to data transfer control units 315 within the selector units 13. In addition, the data transfer control unit 310 includes an arbitor 308 for performing arbitration of access requests from either the host IF 102 or the drive IFs 103 while performing switching of the selector 302.

Figure 6:
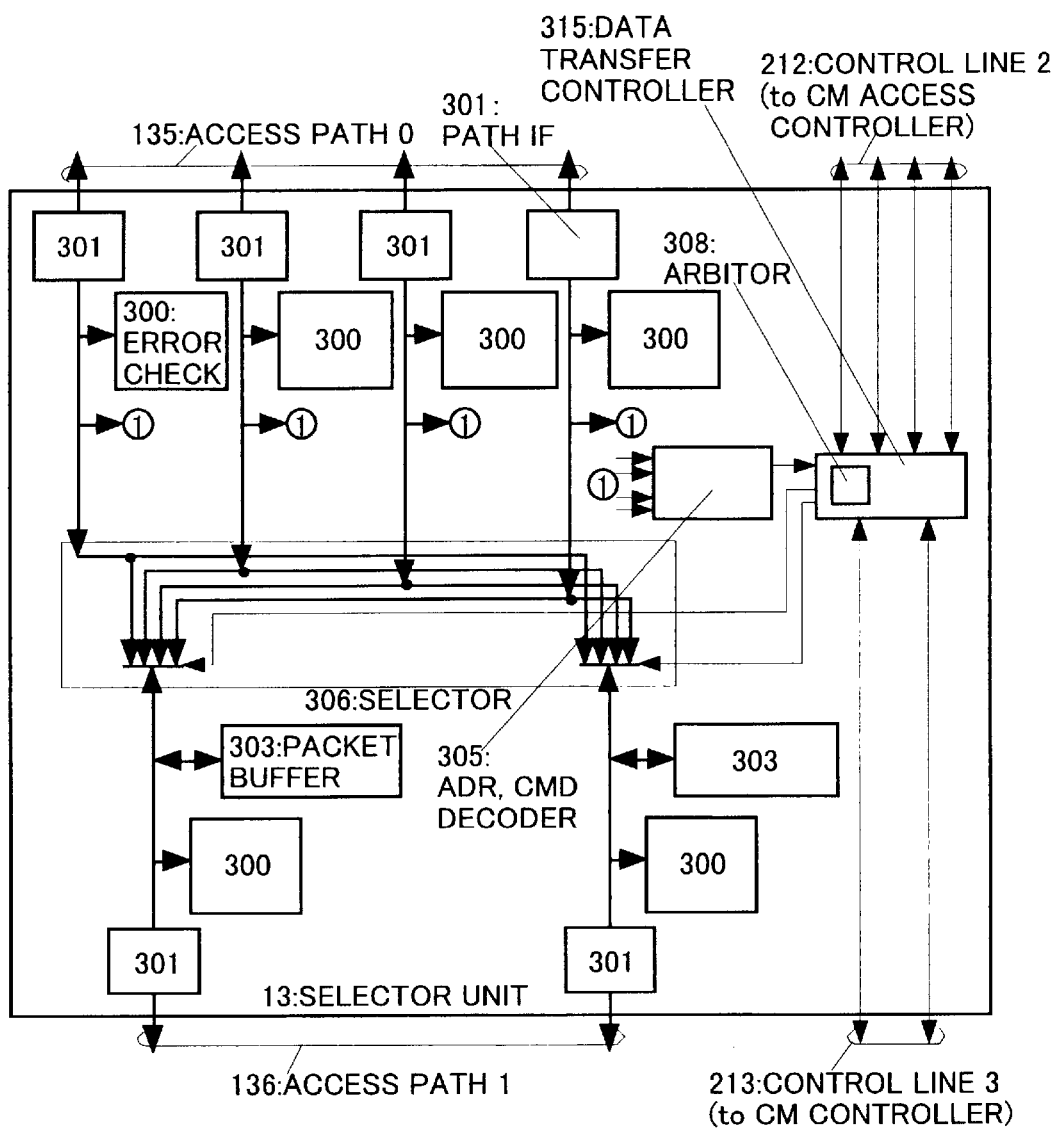
FIG. 6 is a diagram showing a configuration of a selector unit in the disk array controller in accordance with the invention.

FIG. 6 shows an internal configuration of the selector unit 13. The selector unit 13 has four path IFs 301 associated with the access path 0:135 connected to the channel IF units 11 and disk IF units 12, two path IFs 301 associated with the access paths 1:136 connected to the CM controllers 107, a selector 306 for connection between the both, packet butters 303, data error check units 300, an address/command (adr, cmd) decoder 305 for decoding an address and command as sent from the CM access control unit(s) 104, and a data transfer control unit 315. The data transfer control unit 315 is connected by control lines 2:212 to the data transfer control units 310 within the CM access control units 104 and also is connected by control lines 3:213 to the data transfer control units 315 in the CM controllers 107. The data transfer control unit 315 includes an arbitor 308 for performing arbitration of access requests from four access paths 0:135 which were decoded by the adr, cmd decoder 305 while performing switching of the selector 306. The packet buffers 303 operate in a way such that in cases where a difference in data transfer rate is found between the paths on the side of access paths 0:135 and those on the side of access paths 1:136, they exhibit buffering of part or all of the data being transferred in order to absorb such rate difference.

The adr, cmd decoder 305 has buffers for storage of an address and command, an adr extractor unit, and cmd extractor unit (not shown in the drawing). At the adr, cmd decoder 305, store addresses and/or commands in buffers as assigned to four access paths 0:135 connected to the CM access control units 104 on a one-per-path basis—namely, the individual one of them is assigned to a respective one of four access paths 0:135. At the adr extractor unit and cmd extractor unit, specify a CM controller 107 to be accessed and also specify the type or kind of access, and then send to the arbitor 308 within the data transfer control unit 135.

Figure 7:
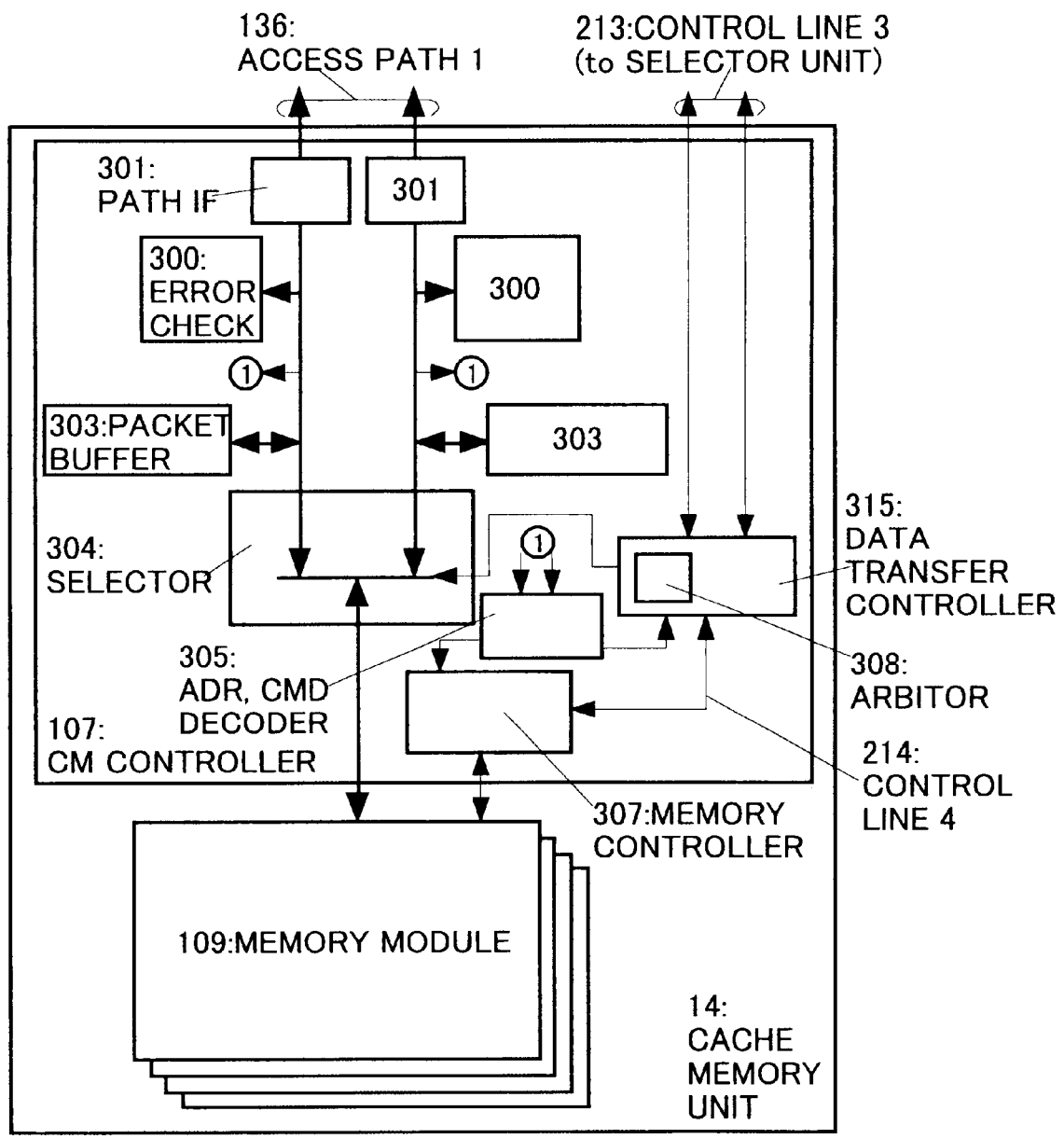
FIG. 7 is a diagram showing a configuration of a cache memory unit in the disk array controller in accordance with the invention.

FIG. 7 shows a configuration of inside of the cache memory unit 14. The cache memory unit 14 has a CM controller 107 and memory module 109. The CM controller 107 has two path IFs 301 associated with the access paths 1:136 connected to the selector units 13, a selector 304, packet buffers 303 for temporal data storage, data error check units 300, a memory control unit 307 for controlling access to the memory module 109, an adr, cmd decoder 305 for decoding an address and command as sent from the CM access control unit(s) 104, and a data transfer control unit 135. The data transfer control unit 315 is connected by control lines 3:213 to the data transfer control units 315 within the selector units 13. The data transfer control unit 315 uses its arbitor 308 to perform arbitration of access requests from two access paths 1:136 as has been decoded by the adr, cmd decoder 305 while performing switching of the selector 304.

The adr, cmd decoder 305 has buffers, an adr extractor unit, and a cmd extractor unit (now shown in the drawing). At the adr, cmd decoder 305, store addresses and/or commands in buffers that are assigned one-by-one to two access paths 1:136 as connected to the CM controllers 107. At the adr extractor unit and cmd extractor units, specify the address of a memory to be accessed and the type of access for transmission toward the memory control unit 307. In addition, send access requests from two access paths 1:136 to the arbitor 308 within the data transfer control unit 315.

A description will next be given of the procedure at the time of getting access to the cache memory units 14. In the event of access to the cache memory unit or units 14, the microprocessor 101 instructs either the host IF(s) 102 or drive IF(s) 103 to begin getting access to the cache memory unit(s) 14.

Upon receiving of the instruction of access start, either the host IF 102 or drive IF 103 transmits a signal indicative of such access start via the control line(s) 1:211 toward the data transfer control unit(s) 310 within the CM access control unit(s) 104. Simultaneously, it sends forth an address, command and data (only when data writing) through data line(s) 210.

The CM access control unit 104 stores in the packet buffer(s) 303 the address and command and data (only when data writing) as sent via the data line(s) 210. The data transfer control unit 310 performs arbitration to determine the right to use the path IF or IFs 301 for switching the selector 302.

Figure 9:
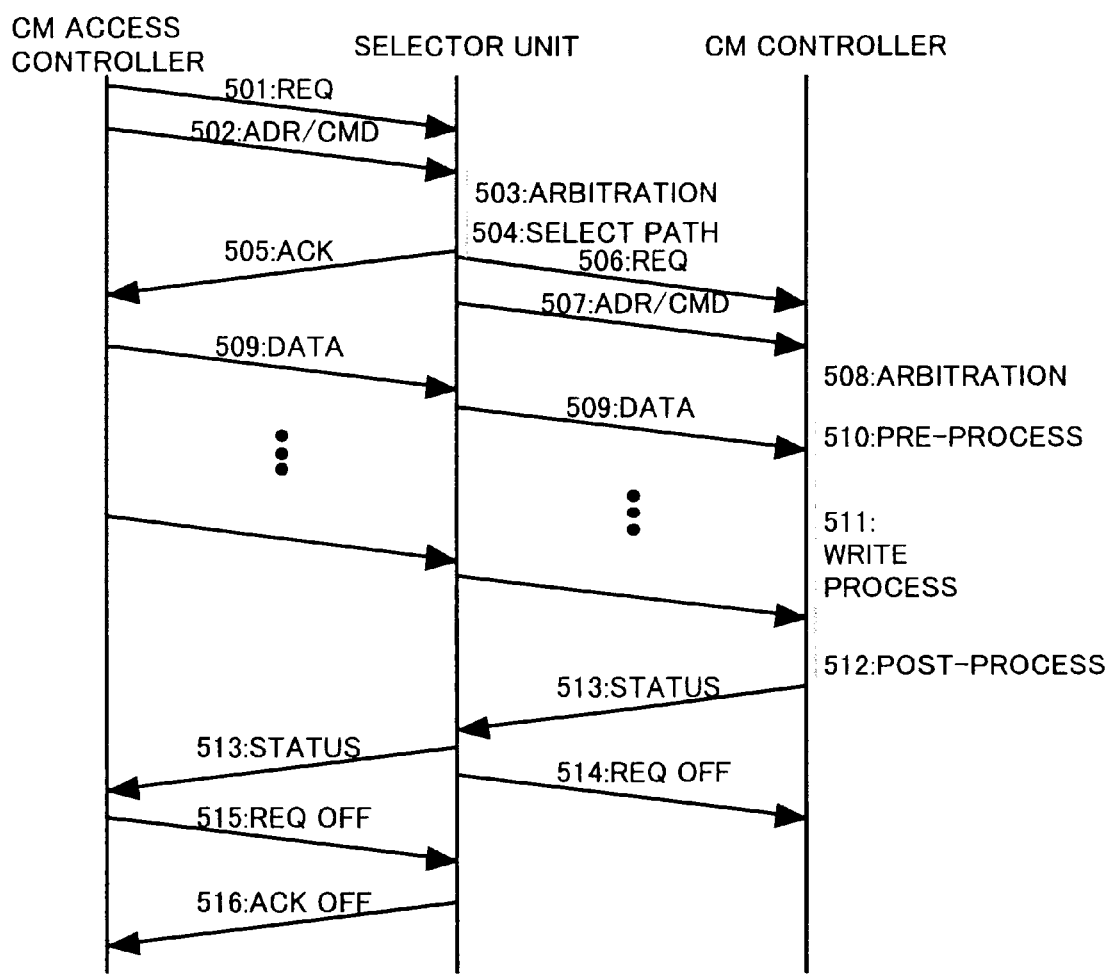
FIG. 9 is a diagram showing a procedure during writing data into the cache memory unit.

FIG. 9 shows a flow of access from the CM access control unit 104 to the CM controller 107 in the event of writing data into the cache memory unit(s) 14. Upon determination of the use right of access path 0:135 by arbitration, the data transfer control unit 310 within the CM access control unit 104 generates and issues a signal (REQ) indicative of the access start toward the data transfer control unit(s) 315 within the selector unit(s) 13 via the control lines 2:212 (at step 501). Subsequently, send out an address and command (step 502).

Upon receipt of the REQ signal from the CM access control unit 104, the data transfer control unit 315 within the selector unit 13 next receives an address and command that will be sent through the access path(s) 0:135 to perform arbitration on the basis of an access request as decoded by the adr, cmd decoder 305 (step 503). Once the arbitration results in obtainment of the right to connect to the access path(s) 1:136, the data transfer control unit 315 switches the selector 306 (step 504) while at the same time returning via control line(s) 2:212 to the data transfer control unit(s) 310 within the CM access control unit(s) 104 a signal (ACK) indicative of the fact that the right of connection to the access path(s) 1:136 has been obtained (step 505). Next, the data transfer control unit 315 outputs via control lines 3:213 to the data transfer control unit(s) 315 within the CM controller(s) 107 a signal (REQ) indicating the start of access (step 506). Subsequently, send forth an address and command (step 507).

When receiving the ACK signal the CM access control unit 104 reads data out of the packet buffer(s) 303 for transmission to the access path(s) 0:135 through the selector 302 and path IF(s) 301. The selector unit or units 13 send data transmitted via the access path(s) 0:135 to the access path(s) 1:136 through the path(s) IF 301 and selector 306 (step 509).

Upon receiving of the REQ signal via the control line(s) 3:213, the data transfer control unit 315 within the CM controller 107 next receives an address and command that will be sent through the access path(s) 1:136 to perform arbitration on the basis of the access request that has been decoded by the adr, cmd decoder 305 (at step 508), thereby switching the selector 304. Store the data as sent via the access path(s) 1:136 in the packet buffer(s) 303. If the arbitration results in obtainment of the right to give access to the memory module 109 then send memory control information to the memory control unit 307 for effectuation of preprocessing for memory access (step 510). Next, read data from the packet buffer(s) 303 for writing into the memory module 109 via the selector 304 (step 511).

After having completed access to the memory module 109, perform post-processing of such memory access and let the data transfer control unit 315 generate a status (STATUS) indicative of an access situation (step 512). Next, transmit the status to the CM access control unit(s) 104 through the selector unit(s) 13 (step 513). Upon receipt of the status, the data transfer control unit(s) 315 within the selector unit(s) 13 turns off the REQ signal to the CM controller(s) 107 (step 514). Upon receiving of the status, the data transfer control unit(s) 310 within the CM access control unit(s) 104 turns off the REQ signal to the selector unit(s) 13 (step 515). When having affirmed turn-off of the REQ signal from the CM access control unit(s) 104, the data transfer control unit(s) 315 within the selector unit(s) 13 turns off the ACK signal being sent to the CM access control unit(s) 104 (step 516).

Upon receipt of the status, the data transfer control unit 310 within the CM access control unit 104 notifies either the host IFs 102 or drive IFs 103 of termination of access to the cache memory unit(s) 14 via control line(s) 1:211.

A flow of access from the CM access control unit(s) 104 to the CM controller(s) 107 in the event of reading data out of the cache memory unit(s) 14 is the same as that in the case of data writing as far as the steps 501 to 508 and those following the step 512 are concerned.

Here, upon receiving of the ACK signal at step 505, the CM access control unit 104 enters the data receipt wait state.

When having obtained the memory access right at step 508, the CM controller 107 reads data from the memory module 109 for transmission to the access path(s) 1:136 through the selector(s) 304 and path IF(s) 301.

Upon receipt of data via the access path(s) 1:136, the selector unit or units 13 send data to the access path(s) 0:135 through the path IF(s) 301 and selector 306.

Upon receiving of data via the access path(s) 0:135, the CM access control unit 104 transmits data through the selector 302 and data line 210 toward either the host IFs 102 or the drive IFs 103.

Figure 5:
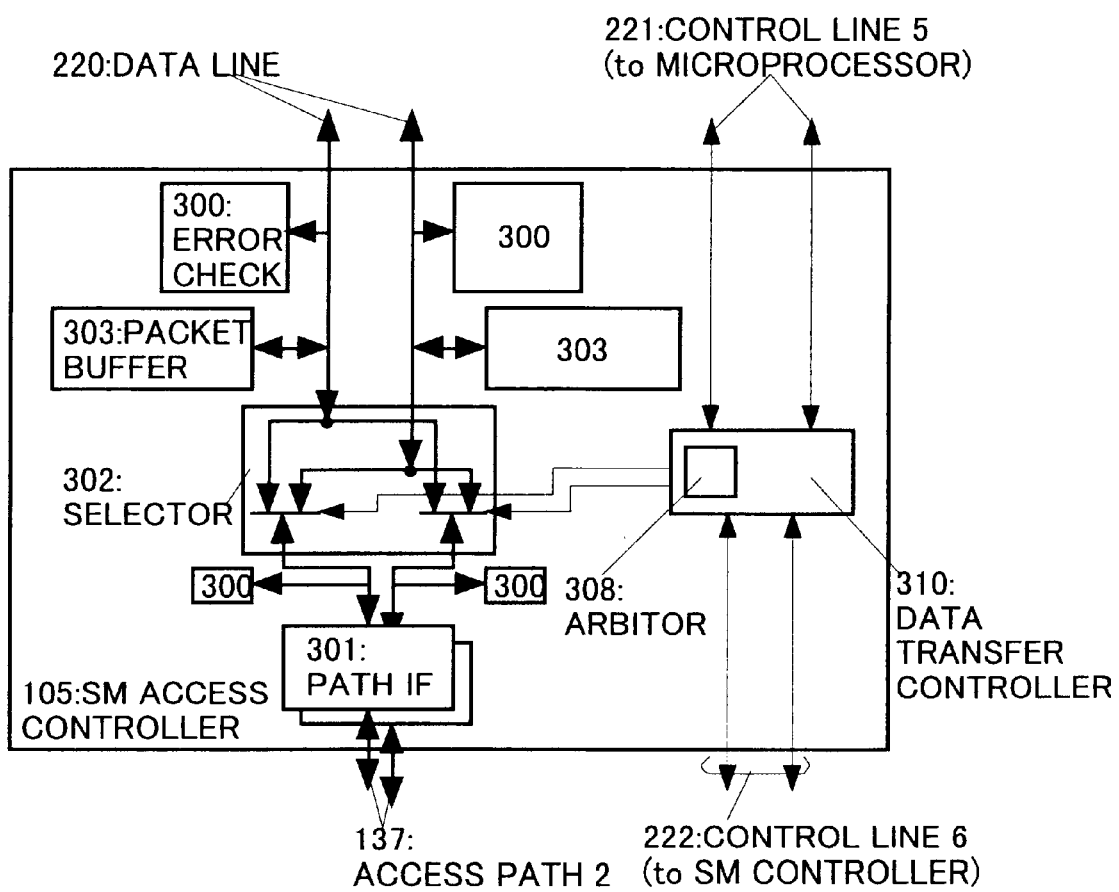
FIG. 5 is a diagram showing a configuration of an SM access control unit within the disk array controller in accordance with the invention.

FIG. 5 shows a configuration inside of the SM access control unit 105. The SM access control unit 105 has a selector 302, packet buffers 303 for temporarily storing therein an address and command along with data, a path IF 301 associated with access paths 2:137 connected to the SM controllers 108, data error check units 300, and a data transfer control unit 310. Two ports of the selector 302 are connected by data lines 220 to the microprocessors 101. The other two ports of the selector 302 are connected to the path IF 301. The path IF 301 is connected by access paths 2:137 to the SM controllers 108. The data transfer control unit 310 is connected by control lines 5:221 to the microprocessors 101 and also connected by control lines 6:222 to the data transfer control units 315 within the SM controllers 108. The data transfer control unit 310 uses its arbitor 308 to perform arbitration of access requests from the microprocessors 101 for switching of the selector 302.

Figure 8:
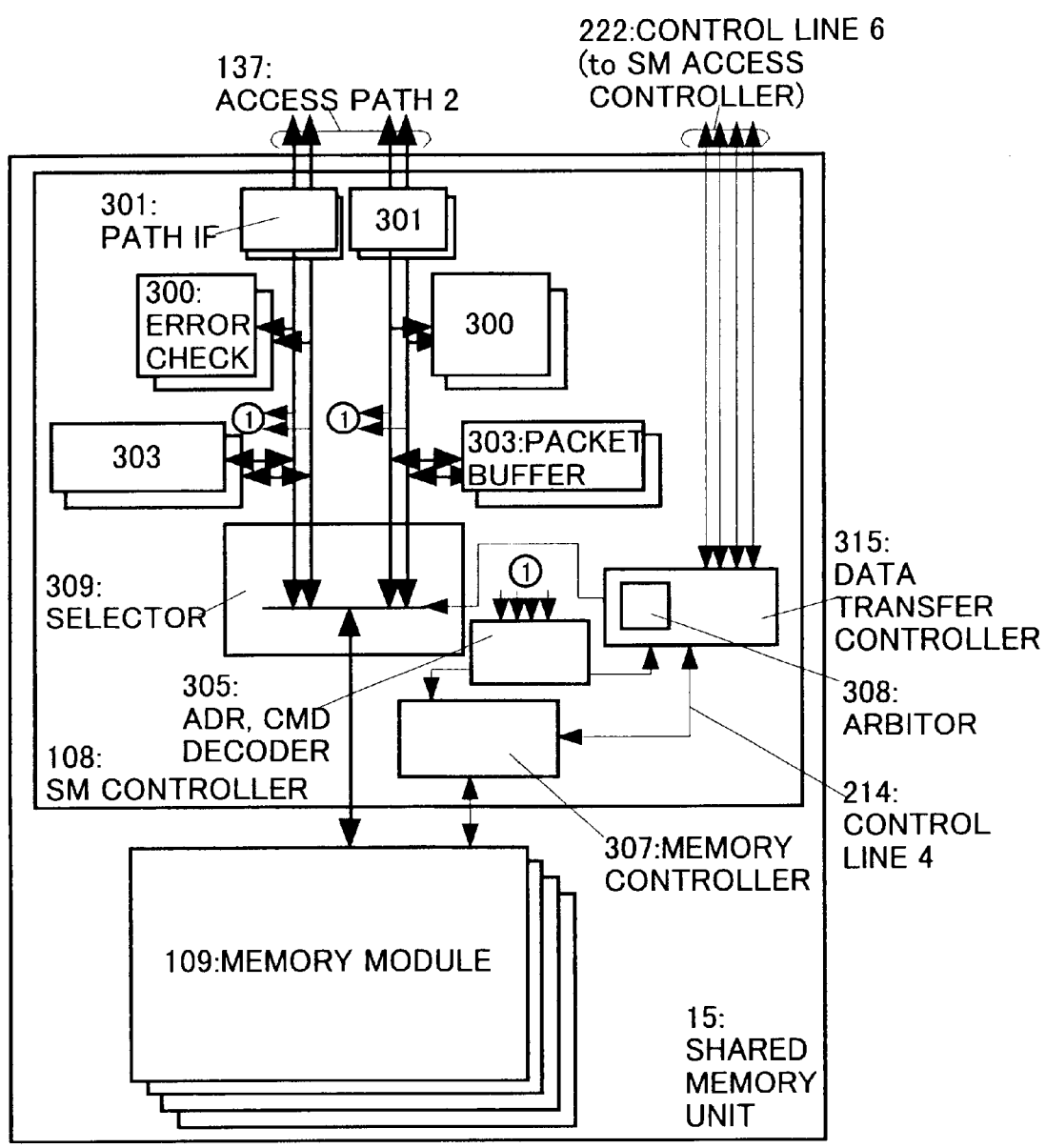
FIG. 8 is a diagram showing a configuration of a shared memory unit in the disk array controller in accordance with the invention.

FIG. 8 shows an arrangement inside of the shared memory unit 15. The shared memory unit 15 has its SM controller unit 108 and memory module 109. The SM controller 108 has four path IFs 301 associated with the access paths 2:137 connected to the SM access control units 105, a selector 309, packet buffers 303 for temporal data storage, data error check units 300, a memory control unit 307 for controlling access to the memory module 109, an "adr, cmd" decoder 305 for decoding address and command as sent from the SM access control unit(s) 105, and a data transfer control unit 315. The data transfer control unit 315 is connected by control lines 6:222 to the data transfer control units 310 within the SM access control units 105. The data transfer control unit 315 performs using its arbitor 308 arbitration of access requests from four access paths 2:137 as decoded by the adr, cmd decoder 305 for switching of the selector 309.

The adr, cmd decoder 305 has buffers, an adr extractor unit, and a cmd extractor unit (not shown). At the adr, cmd decoder 305, store address and command in certain buffers as assigned to four access paths 2:137 connected to the SM controller 108 respectively on a one-to-one basis. At the adr extractor unit and cmd extractor unit, specify the address of a memory to be accessed along with the type of access for transmission toward the memory control unit 307. In addition, it sends access requests from four access paths 2:137 to the arbitor 308 within the data transfer control unit 315.

Next, there will be described a procedure at the time of getting access to the shared memory units 15. In the case of getting access to the shared memory units 15, the microprocessor 101 sends forth a signal representative of access start through the control lines 5:221 to the data transfer control unit(s) 310 within the SM access control unit(s) 105. Simultaneously, send address and command along with data (only when data writing) via data lines 220.

The SM access control unit 105 stores in the packet buffer(s) 303 the address and command and data (only when data writing) as sent via the data lines 220. The data transfer control unit 310 performs arbitration to determine the right to use the path IFs 301 for switching the selector 302.

Figure 10:
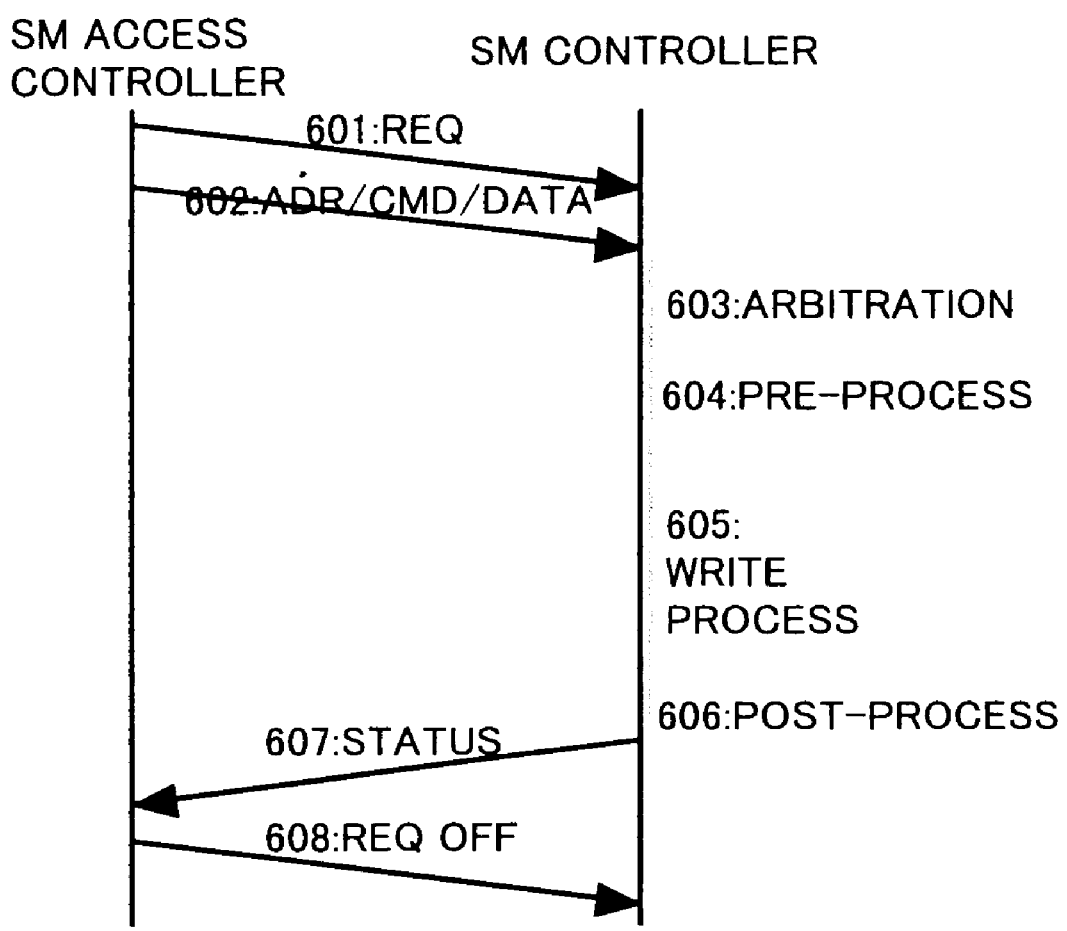
FIG. 10 is a diagram showing a procedure during writing data into the shared memory unit.

FIG. 10 shows a flow of access from the SM access control unit 105 to the SM controller 108 in the case of writing data into the shared memory unit(s) 15. Upon determination of the use right of access paths 2:137 by such arbitration, the data transfer control unit 310 within the SM access control unit 105 issues a signal (REQ) indicative of access start to the SM controller 108 via control lines 6:222 (step 601). Then, send continuously address and command along with data (step 602).

Upon receipt of the REQ signal via control line 6:222, the data transfer control unit 315 within the SM controller 108 next receives address and command and data as sent via the access paths 2:137. Let the adr, cmd decoder 305 decode the address and command; perform arbitration on the basis of an access request (step 603) for switching the selector 309. Let data be stored in the packet buffer(s) 303. If the arbitration results in obtainment of the access right to the memory module 109 then send memory control information to the memory control unit 307 to thereby perform the preprocessing for memory access (step 604). Next, read data out of the packet buffer's) 303 for writing into the memory module 109 via the selector 309 (step 605).

After having completed an attempt to get access to the memory module 109, perform the post-processing of memory access to thereby generate at the data transfer control unit 315 a status (STATUS) indicative of the access situation (step 606). Next, send the status to the SM access control unit 105 (step 607). Upon receipt of the status, the data transfer control unit 310 within the SM access control unit 105 turns off the REQ signal as sent to the SM controller 108 (step 608).

Upon receiving of the status, the data transfer control unit 310 within the SM access control unit 105 notifies via control lines 5:221 the microprocessors 101 of termination of access to the shared memory units 15.

A flow of access from the SM access control unit 105 to the SM controller 108 in the case of reading data from the shared memory unit(s) 15 is the same as that in the case of data writing with respect to the steps 601 to 604 and the step 606 et seq.

After having performed the preprocessing of memory access at step 604, the SM controller 108 reads data out of the memory module 109 for transmission to the access paths 2:137 via the selector 309 and path IF(s) 301.

When receiving data via the access paths 2:137 the SM access control unit 105 sends data to the microprocessors 101 via the selector 302 and data lines 220.

It is noted that the disk array controller 1 of this embodiment, each channel IF unit 11 has two built-in host IFs. Each host IF is operable to process those requests from respective channels as connected thereto in a parallel fashion.

Incidentally, the disk array controller 1 is such that in the event of reading data for transmission to the host computer 50, let data stored in the magnetic disk device 20 be written via the disk IF unit(s) 12 into the cache memory unit(s) 14, which data will be read out of the cache memory unit(s) 14 for transmission to the host computer via the channel IF unit(s) 11. Alternatively, in the case of writing data from the host computer 50 into the disk array controller 1, let data sent from the host computer 50 to the channel IF unit(s) 12 be written into the cache memory unit(s) 14, which data will be read from the cache memory unit(s) 14 for writing via the disk IF unit(s) 12 to the magnetic disk device 20. Furthermore, in order to generate a data parity for writing into the magnetic disk device 20, further access is carried out two or three times between the disk IF unit(s) 12 and the cache memory unit(s) 14.

Accordingly, in order to parallel-process all of the requests from respective channels as connected to more than one host computer, it is a must to let the throughput between the channel and disk IF units 11, 12 and the cache memory units 14 be greater than or equal to twice of the maximum throughput between the host computer 50 and the channel IF units 11.

In this embodiment, let both the band width of an access path between the CM access control unit 104 and CM controller 107 and the entire bandwidth between the CM controller 107 and memory module 109 be set at or above twice the maximum bandwidth between the channel IF units 11 and the host computer 50. Thus, it becomes possible to permit parallel operation of all the channel IF units 11.

According to this embodiment, it becomes possible to increase the throughput between the channel and disk IF units 11, 12 and the cache memory units 14 and also increase the throughput between the channel and disk IF units 11, 12 and the shared memory units 15 while shortening an access time required. It is thus possible to provide the intended disk array controller high in throughput and yet short in response time.

Figure 15:
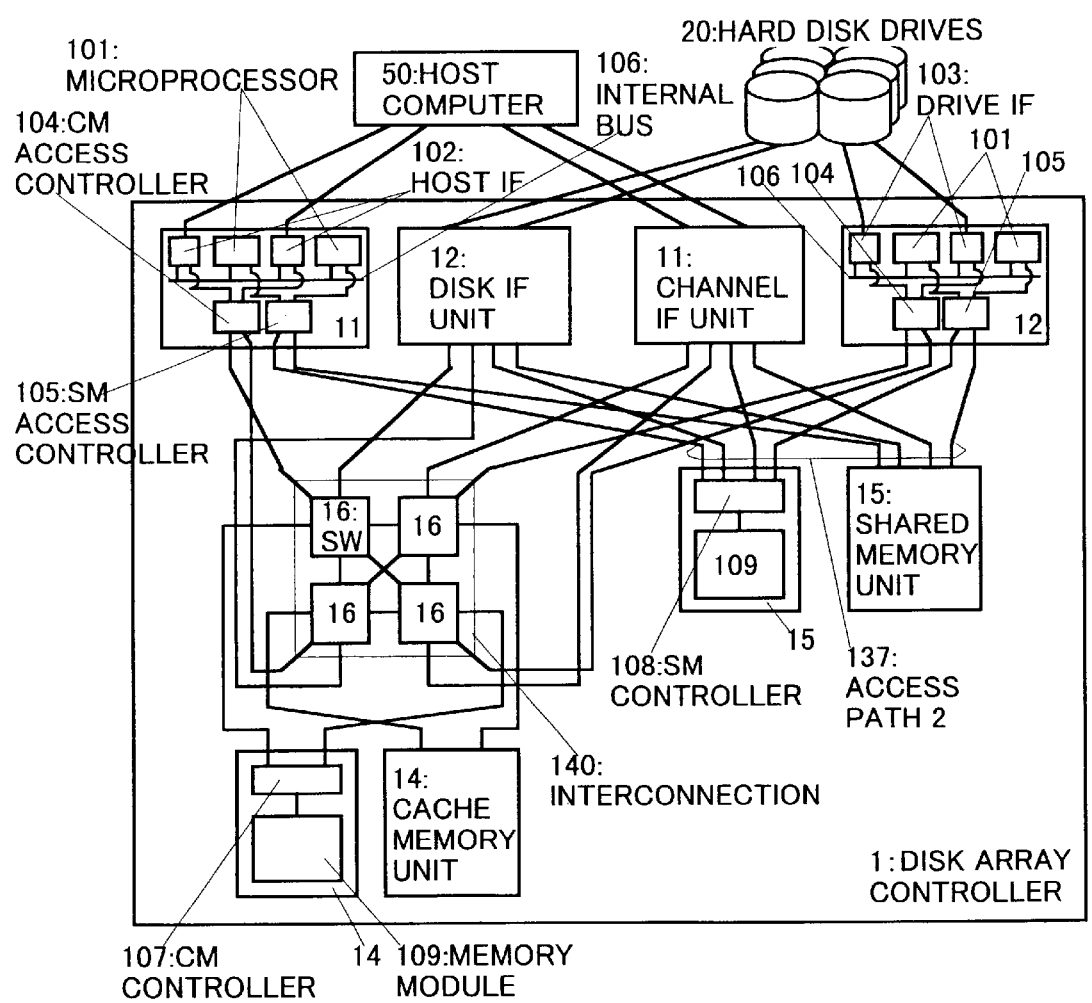
FIG. 15 is a diagram showing another configuration of the inside of a disk array controller in accordance with the invention.

Here, as shown in FIG. 15, an interconnection network 140 using switches (SWs) 16 is employed to connect between the channel and disk IF units 11, 12 and the cache memory units 14. In this case also, as in the arrangement using the selector units 13 shown in FIG. 1, it becomes possible to enhance the throughput due to an ability to provide a plurality of access paths to the cache memory units 14.

Figure 16:
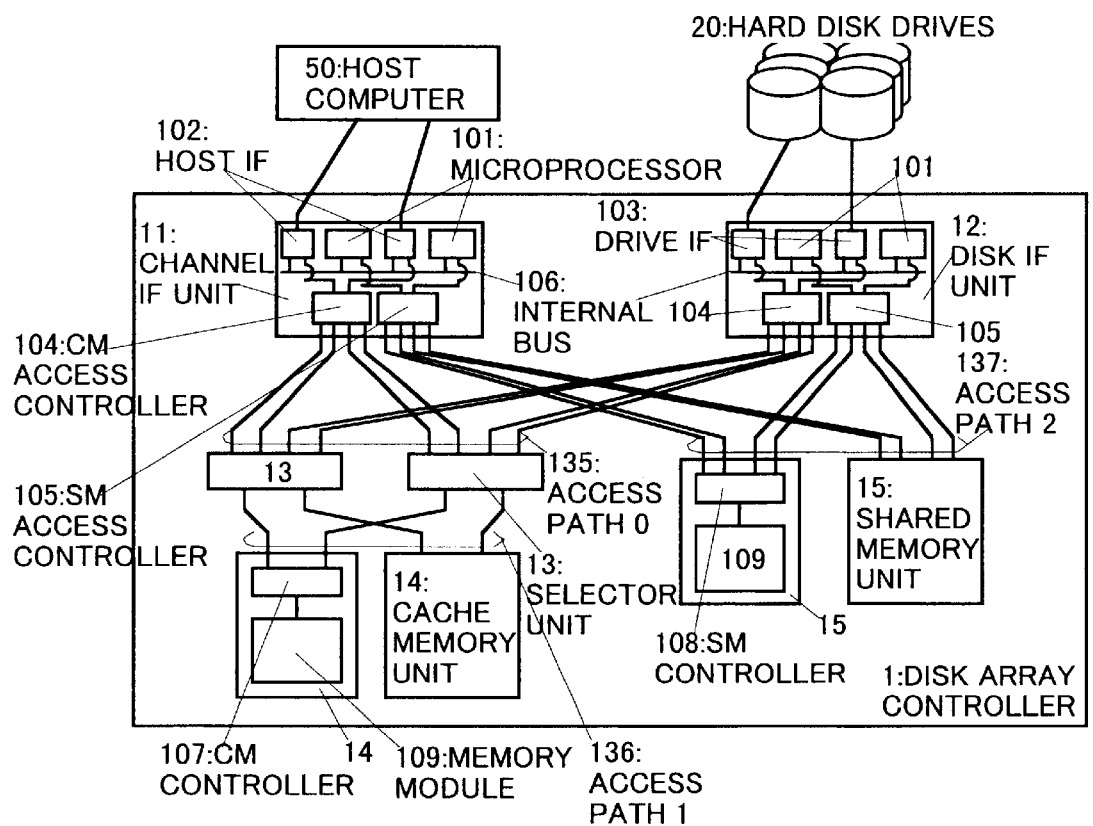
FIG. 16 is a diagram showing another configuration of the inside of a disk array controller in accordance with the invention.

In addition, as shown in FIG. 16, no problems occur in implementation of this embodiment even in a disk array controller 1 that is modified to increase the line number of the access paths 0:135 connected to a single CM access control unit 104 so that it is twice of that in the configuration of FIG. 1, i.e. four lines. It is considered that high-speed IFs of 100 MB per second or more in throughput, such as fiber channels or else, will be used as the host IFs and drive IFs in near future. By taking account of the balance of throughputs at the channel IF units 11 and disk IF units 12, it is required that the throughput of all the access paths 0:135 connected to a single CM access control unit 104 be greater than or equal to the throughput of either all the host IFs 102 within the channel IF units 11 or all the drive IFs 103 within the disk IF units 12. As previously stated, in the case of using high-speed IFs such as fiber channels or else, it is possible by increasing the line number of access paths 0:135 connected to a single CM access control unit 104 as shown in FIG. 16 to let the throughput of access paths 0:135 be greater than or equal to the throughput of either the host IF 102 or drive IF 103.

Additionally, although in the disk array controllers of FIGS. 15 and 16 the selector units 13 and cache memory units 14 and shared memory units 15 are each doubly configured or "duplicated" for fault tolerance enhancement, the effects and advantages above may be obtained without having to employ such duplication.

[Embodiment 2]

In FIG. 1, it becomes possible to increase the reliability of data by duplicating all or part of the memory region between two cache memory units 14 to permit writing of the same data into such duplicated two regions when writing data into the cache memory units 14.

A procedure of writing data into two cache memory units 14 duplicated is as follows.

The host IF 102 or the drive IF 103 that has received an instruction to start access sends forth via control lines 1:211 a signal indicative of the access start toward the data transfer control unit 310 within the CM access control unit 104. Simultaneously, transmit two addresses and commands along with a single datum through data lines 210.

The CM access control unit 104 stores in its packet buffer(s) 303 the two addresses and commands and single datum that have been sent via the data line(s) 210. The data transfer control unit 310 performs arbitration to determine the use right of the path IFs 301 for switching the selector 302.

Figure 11:
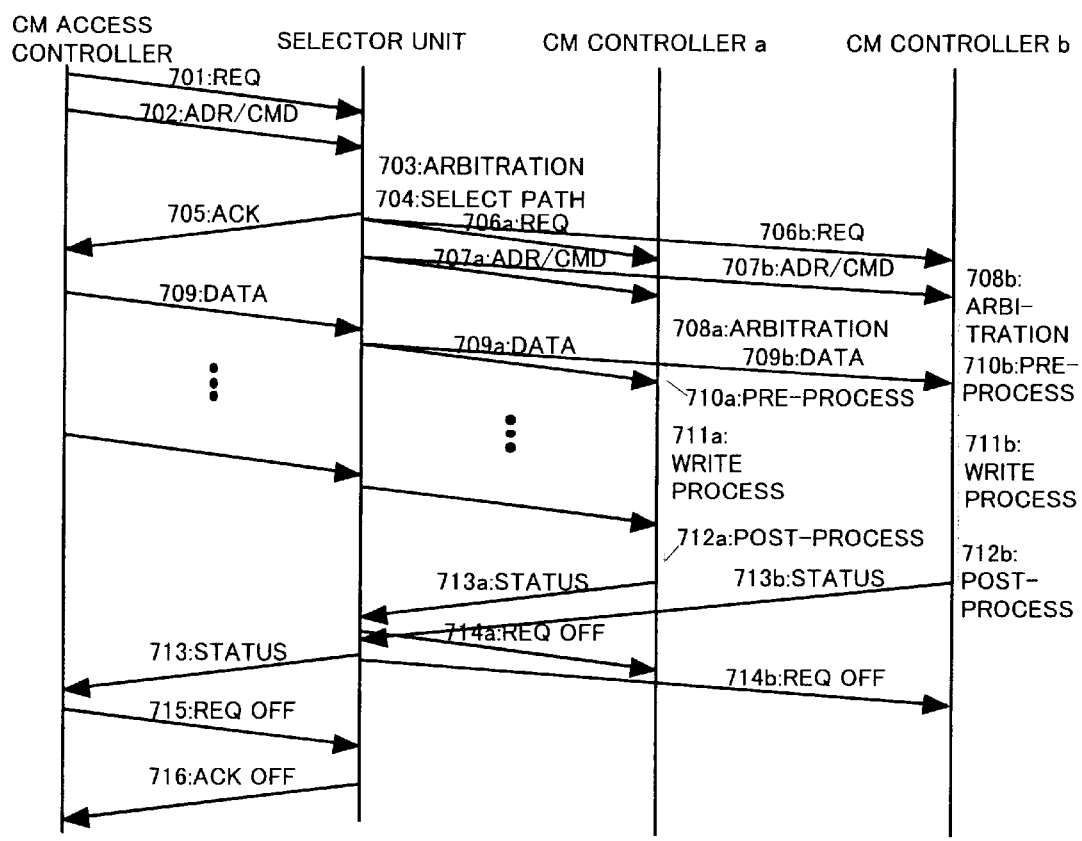
FIG. 11 is a diagram showing a procedure during doubly writing data into two cache memory units duplicated.

FIG. 11 shows a flow of access from the CM access control unit 104 to two CM controllers a, b:107 in the case of writing data to two cache memory units 14 duplicated. Upon determining of the use right of access paths 0:135 by arbitration, the data transfer control unit 310 within the CM access control unit 104 issues via control lines 2:212 a signal (REQ) indicative of the access start to the data transfer control units 315 within the selector units 13 (step 701). Subsequently, send two addresses and commands progressively (step 702).

Upon receipt of the REQ signal from the CM access control unit 104, the data transfer control unit 315 within the selector unit 13 next receives address and command as sent via the access paths 0:135 to perform arbitration on the basis of the access request decoded by the adr, cmd decoder 305 (step 703). If the arbitration results in obtainment of both of the connect rights to two access paths 1:136 leading to the CM controllers a, b: 107 then the data transfer control unit 315 switches the selector 306 (step 704) while at the same time returning via control lines 2:212 to the data transfer control unit 310 within the CM access control unit 104 a signal (ACK) indicative of the fact that the connect rights to the CM controllers a, b:107 have been obtained (step 705). Next, the data transfer control unit 315 generates and issues via control lines 3:213 a signal (REQ) representative of the access start toward the data transfer control units 315 within two CM controllers 107 (steps 706a, 706b). Subsequently, send addresses and commands one by one to the CM controllers a, b:107 (steps 707a, 707b).

Upon receiving of the ACK signal, the CM access control unit 104 reads data out of the packet buffer(s) 303 for transmission via the selector 302 and path IFs 301 toward the access paths 0:135 (step 709). The selector unit 13 sends a single datum that was sent via the access path 0:135 to both of the two access paths 1:136 through the path IFs 301 and selector 306 (step 709a, 709b).

Upon receipt of the REQ signal via control line 3:213, the data transfer control units 315 within the CM controllers a, b:107 will next receive addresses and commands sent over the access paths 1:136 to perform arbitration on the basis of the access requests as decoded by the adr, cmd decoder 305 (steps 708a, 708b) for switching the selector 304. Let the data sent via the access path(s) 1:136 be stored in the packet buffer(s) 303. If arbitration results in obtainment of the right to get access to the memory module 109 then send memory control information to the memory control unit 307 and perform the preprocessing for memory access (steps 710a, 710b). Next, read data from the packet buffer(s) 303 to write into the memory module 109 via the selector 304 (step 711a, 711b).

Upon completion of access to the memory module 109, perform post-processing of memory access; then, let the data transfer control unit 315 generate a status (STATUS) indicative of such access situation (steps 712a, 712b). Next, send the status via the selector unit 13 to the CM access control units 104 (steps 713a, 713b). Upon receiving of the status, the data transfer control unit 315 within the selector unit 13 turns off respective REQ signals as sent to the CM controllers a, b:107 (steps 714a, 174b). In addition, when receiving the statuses from both of the CM controllers a, b:107, the selector unit 13 sends them to the CM access control unit(s) 104 in succession (step 713). Upon receipt of two statuses, the data transfer control unit 310 within the CM access control unit 104 turns off the REQ signal being sent to the selector unit 13 (step 715). Once the turn-off of he REQ signal from the CM access control unit 104 is affirmed, the data transfer control unit 315 within the selector unit 13 turns off the ACK signal as sent to the CM access control unit 104 (step 716).

Upon receipt of the status, the data transfer control unit 310 within the CM access control unit 104 notifies via control lines 1:211 either the host IFs 102 or the drive IFs 103 of termination of access to the cache memory units 14.

As previously stated, in the case of doubly writing data into the duplicated cache memory units 14, it is required, while one of the data items to be doubly written is being subject to the write processing, to prevent unintentional rewriting of the remaining one of the data items in deference to a write request from the other access path. In this embodiment, let a directory of the cache memory unit(s) 14 be stored in the shared memory unit(s) 15 to thereby assure establishment of a bit indicative of busy-to-access in the directory as stored in the shared memory unit(s) 15 prior to getting access to the cache memory units 14 without exceptions. With such an arrangement, because only one access request is issued for the same address within the cache memory units 14 at the same time, it is possible during effectuation of write processing of one datum of the data being doubly written to prevent unintentional rewriting of the other datum in reply to a write request from the remaining access path.

[Embodiment 3]

With the disk array controller 1, in case a plurality of cache memory units 14 are provided, there should be required a function of copying data from a certain cache memory unit 14 to another cache memory unit 14. This function is achievable by a procedure as will be described below.

The host IF 102 or the drive IF 103 that has received the instruction to start getting access sends out via control lines 1:211 a signal indicative of the access start to the data transfer control unit 310 in the CM access control unit 104. Simultaneously, transmit two addresses and commands through data lines 210. One address and command of the two may be an address of the copy source and a read command whereas another address and command might be an address of a copy destination or target and a write command. Here, an explanation will be given under an assumption that the CM controllers a:107 is the copy source whereas the CM controller b:107 is the target.

The CM access control unit 104 stores in its packet buffer(s) 303 two address and commands that have been sent via data lines 210. The data transfer control unit 310 performs arbitration to determine the right to use the path IFs 301 for switching the selector 302.

Figure 12:
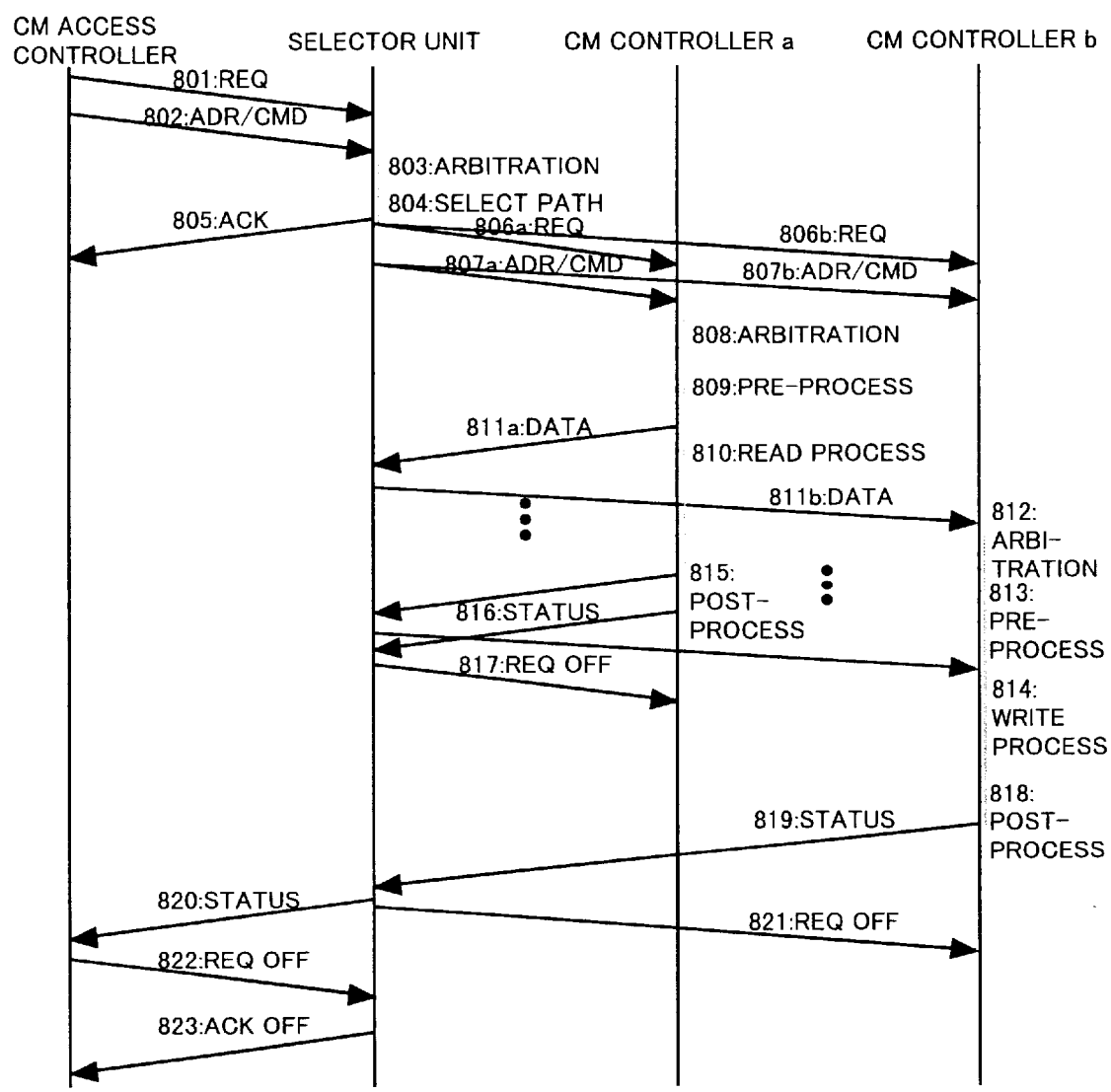
FIG. 12 is a diagram showing a procedure when copying data from one cache memory unit into another cache memory unit.

FIG. 12 shows a flow of access from the CM access control unit 104 to the CM controllers a, b:107 in the event of copying data between two cache memory units. Upon determination of the use right of access paths 0:135 through arbitration, the data transfer control unit 310 within the CM access control unit 104 issues via control lines 2:212 a signal (REQ) indicative of access start toward the data transfer control units 315 within the selector units 13 (step 801). Subsequently, it sends out two addresses and commands consecutively (step 802).

Upon receipt of the REQ signal from the CM access control unit 104, the data transfer control unit 315 within the selector unit 13 will next receive address and command as sent via the access path(s) 0:135 to perform arbitration on the basis of the access request decoded by the adr, cmd decoder 305 (step 803). If the arbitration results in obtainment of both of the connect rights to two access paths 1:136 leading to the CM controllers a, b:107 then the data transfer control unit 315 switches the selector 306 (step 804) while simultaneously returning via control lines 2:212 to the data transfer control unit 310 within the CM access control unit 104 a signal (ACK) indicative of the fact that the right to connect to both of the CM controllers a, b:107 has been obtained (step 805). Next, the data transfer control unit 315 outputs via control lines 3:213 a signal (REQ) indicative of access start to the data transfer control units 315 within the CM controllers a, b:107 (steps 806a, 806b). Subsequently, send respective addresses and commands to the CM controllers a, b:107 (steps 807a, 807b).

Upon receiving of the ACK signal, the CM access control unit 104 enters a state waiting for receipt of a status that notifies the termination of access event.

When receiving the REQ signal via the control lines 3:213, the data transfer control unit 315 within the CM controller a:107 of the copy source will next receive address and command sent through the access path 1:136 to perform arbitration on the basis of the access request as decoded by the adr, cmd decoder 305 (step 808) for switching the selector 304. If such arbitration results in obtainment of the right to get access to the memory module 109 then send memory control information to the memory control unit 307 and then perform preprocessing for memory access (step 809). Next, read data from the memory module 109 (step 810) for transmission via the selector 304 to access path 1:136 (step 811a).

The selector unit 13 sends the data, which was sent via access path 1:136 from the CM controller a:107, toward the access path 1:136 connected to the CM controller b (step 811b).

Upon receipt of the REQ signal via control line(s) 3:213, the data transfer control unit 315 within the CM controller b:107 will next receive address and command sent through the access path 1:136 for decoding at the adr, cmd decoder 305. Thereafter, wait for initiation of data reception; then, participate in arbitration of memory access (step 812). Let the data sent via the access path 1:136 be stored in the packet buffer(s) 303. If the arbitration results in obtainment of the right to get access to the memory module 109 then send memory control information to the memory control unit 307 and perform preprocessing for memory access (step 813). Next, read data out of the packet buffer(s) 303 for writing into the memory module 109 via the selector 304 (step 814).

Upon completion of access to respective CM memory modules 109, the CM controllers a, b:107 perform post-processing of memory access for generation of statuses (STATUS) indicative of the access situation at their data transfer control units 315 (steps 815, 818). Next, send the statuses to the selector units 13 (steps 816, 819).

Upon receiving of the statuses, the data transfer control unit 315 within the selector unit 13 turns off respective REQ signals for the CM controllers a, b:107 (steps 817, 821). In addition, when receiving statuses from both of two CM controllers a, b:107, the selector unit 13 sequentially sends them to the CM access control unit (step 820). Upon receipt of two statuses, the data transfer control unit 310 within the CM access control unit 104 turns off the REQ signal for the selector unit 13 (step 822). When affirming turn-off of the REQ signal from the CM access control unit 104, the data transfer control unit 315 within the selector unit 13 turns off an ACK signal for the CM access control unit 104 (step 823).

Upon receiving of the status, the data transfer control unit 310 within the CM access control unit 104 notifies via control line(s) 1:211 either the hosts IF 102 or drive IFs 103 of the termination of access to the cache memory units 14.

In the disk array controller 1, there is also required a function of copying data from a certain address to another address within a single cache memory unit 14.

This function is achievable, in the data write procedure shown in FIG. 9, instead of the write access to the memory module 109 at step 511, by reading data from the memory module 109 for storage in the packet buffer(s) 303 within the CM controller 107 and then continuously writing such data into the memory module 109.

[Embodiment 4]

In FIG. 1, it becomes possible to increase the reliability of data by duplicating the whole or part of the memory region between two shared memory units 15 for permitting writing of the same data in such two duplicated regions when writing data into the shared memory units 15.

A procedure in the case of writing data into the two shared memory units 15 duplicated is as follows.

The microprocessor 101 sends out a specific signal via control line 5:221 to the data transfer control unit 310 within the SM access control unit 105, which signal indicates access start. Simultaneously, send two addresses and commands along with a single data item through data line(s) 220.

The SM access control unit 105 stores in its packet buffer(s) 303 the two addresses and commands and a single data item as sent via the data lines 220. The data transfer control unit 310 performs arbitration to determine the use right of the paths IF 301 for switching the selector 302.

Figure 13:
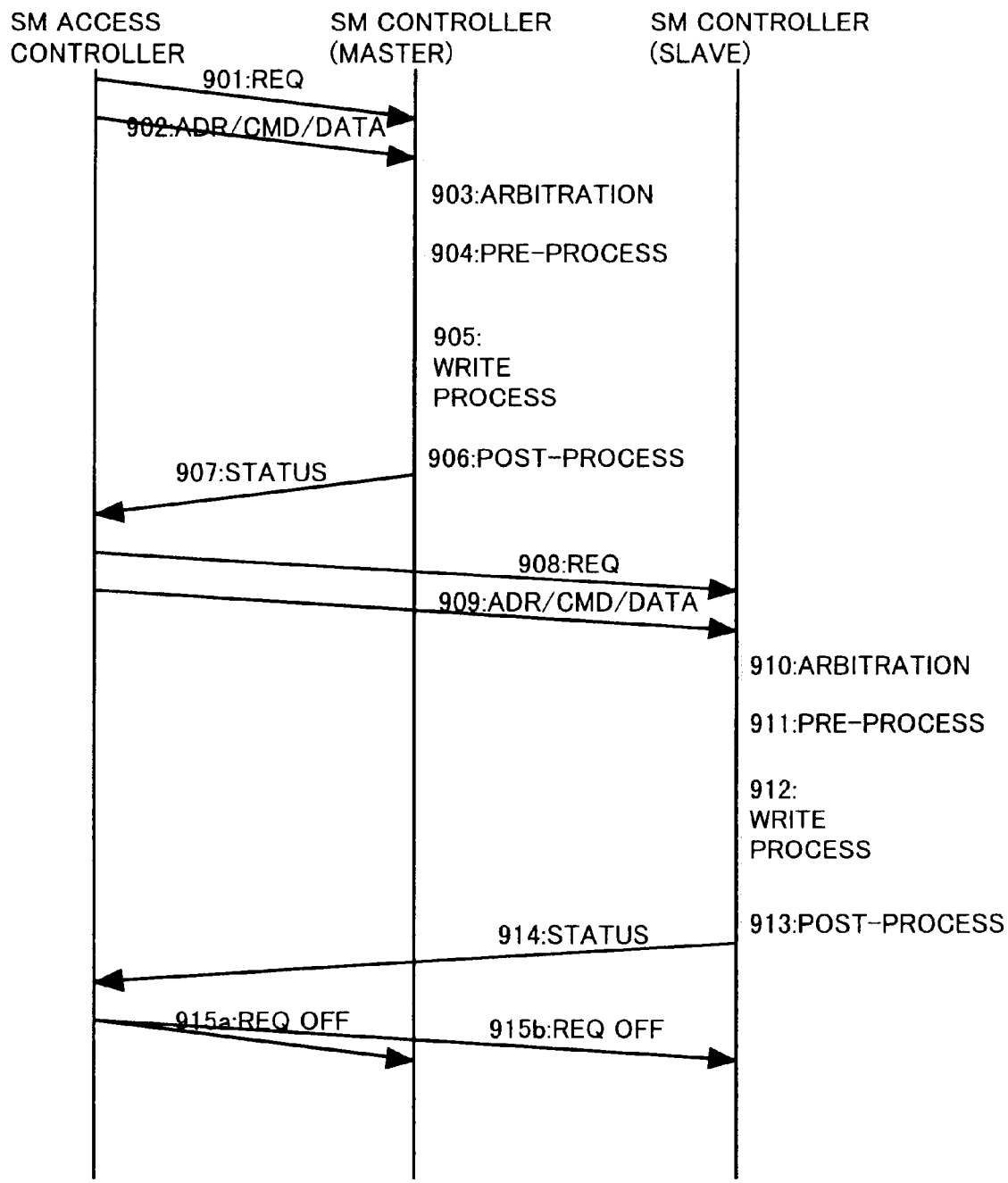
FIG. 13 is a diagram showing a procedure during doubly writing data into two shared memory units duplicated.

FIG. 13 shows a flow of access from the SM access control unit 105 to two SM controllers 108 in the case of writing data into two shared memory units 15 duplicated. In case two shared memory units 15 are duplicated, one of them is set as a master whereas the other is as a slave. The data transfer control unit 310 within the SM access control unit 105 first determines through arbitration the use right of access path 2:137 leading to a maser-side SM controller 108 and then issues via control line 6:222 a signal (REQ) indicative of access start toward the data transfer control unit 315 within the master-side SM controller 108 (step 901). Then, send address and command and data successively (step 902).

Upon receipt of the REQ signal via the control line 6:222, the data transfer control unit 315 within the master-side SM controller 108 will next receive address, command and data sent via access path(s) 2:137 to perform arbitration on the basis of an access request as decoded by the adr, cmd decoder 305 (step 903), and then switches the selector 309. Let data be stored in the packet buffer(s) 303. If the arbitration results in obtainment of the right to get access to the memory module 109 then send memory control information to the memory control unit 307 and perform preprocessing for memory access (step 904). Next, read data out of the packet buffer(s) 303 for writing into the memory module 109 via the selector 309 (step 905).

Upon completion of access to the memory module 109, perform post-processing of memory access for generation of a status (STATUS) at the data transfer control unit 315 (step 906). Next, send the status to the SM access control unit 105 (step 907).

Upon receiving of the status, the SM access control unit 105 determines through arbitration the use right of the access path 2:137 leading to the slave-side SM controller 108 while eliminating release of the use right of access path 2:137 leading to the master-side SM controller 108. The following access procedure (steps 908–914) to the slave-side SM controller 108 is the same as the access procedure (steps 901–907) to the master-side SM controller 108.

Upon receipt of the status from the slave-side SM controller 108, the data transfer control unit 310 within the SM access control unit 105 turns off the REQ signals for both of the master-side and slave-side SM controllers 108 (steps 715a, 715b).

In the case of doubly writing or "duplicating" data into the duplicated shared memory units 15, the shared memory units 15 are divided into the master and slave in the way stated above to thereby write data thereinto in the order of sequence that the master side is first and the slave side follows, and the both access paths 2:137 are not released until completion of data writing to the slave side. Whereby, the data write sequence is guaranteed, which in turn makes it possible to prevent, during performing writing of one datum of the data to be doubly written, any unintentional rewriting of the other datum in response to a write request from another access path.

Upon receiving of the status the data transfer control unit 310 within the SM access control unit 105 notifies via control line 5:221 the microprocessor 101 of the termination of access to the shared memory units 15.

[Embodiment 5]

Figure 14:
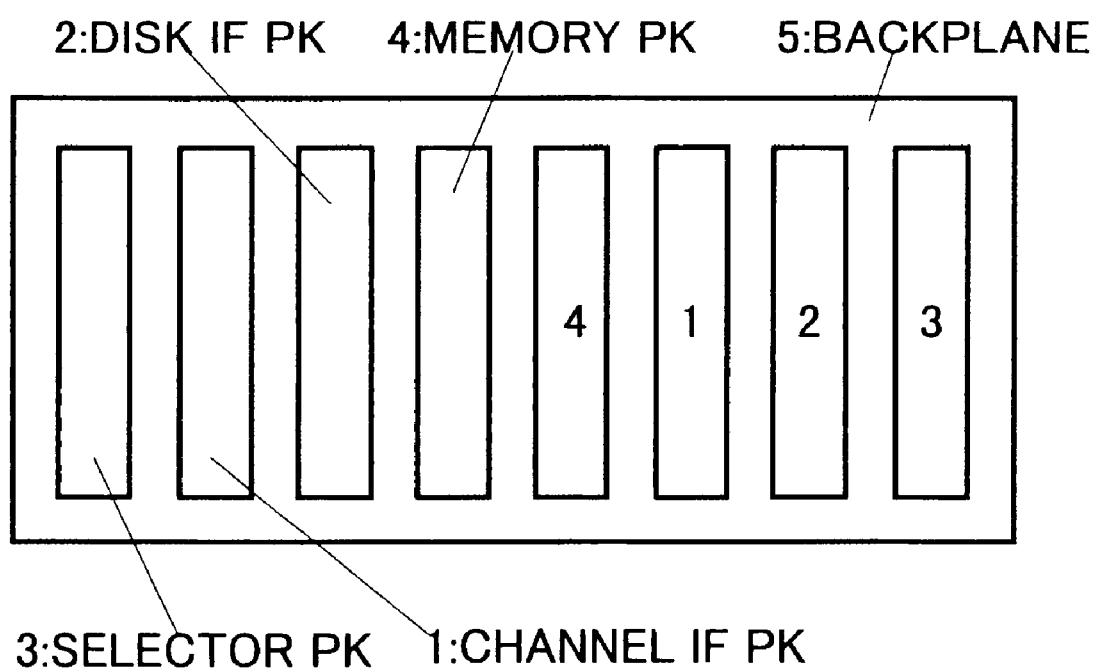
FIG. 14 is a diagram showing a configuration of assembly within the disk array controller in accordance with the instant invention.

Referring to FIG. 14, there is shown a configuration for use in assembly of the channel IF units 11, disk IF units 12, selector units 13, cache memory units 14 and shared memory units 15 of the disk array controller 1 of the embodiment 1.

The channel IF units 11, disk IF units 12, elector units 13, cache memory units 14 and shared memory units 15 are mounted or "sealed" in independent packages (PKs) respectively—that is, channel IF PKs 1, disk IF PKs 2, selector PKs 3, and memory PKs 4. Let different cache memory units 14 be mounted on different packages. Similarly, let different shared memory units 15 be on different packages. No specific problems would occur even when one cache memory unit 14 and one shared memory unit 15 are mounted on the same package. In FIG. 14, there is shown an example with one cache memory unit 14 and one shared memory unit 15 mounted on the same memory PK 4.

Let the channel IF PKs 1, disk IF PKs 2, selector PKs 3 and memory PKs 4 be mounted on a platter 5, which in turn is built in a housing or enclosure.

In this embodiment the selector units 13 are arranged so that these are mounted on the selector PKs 3 to be laid out on the opposite peripheral sides of the platter 5. However, there are no problems even when they are not mounted on any packages and instead are directly mounted on the both sides of the platter.

[Embodiment 6]

Figure 17:
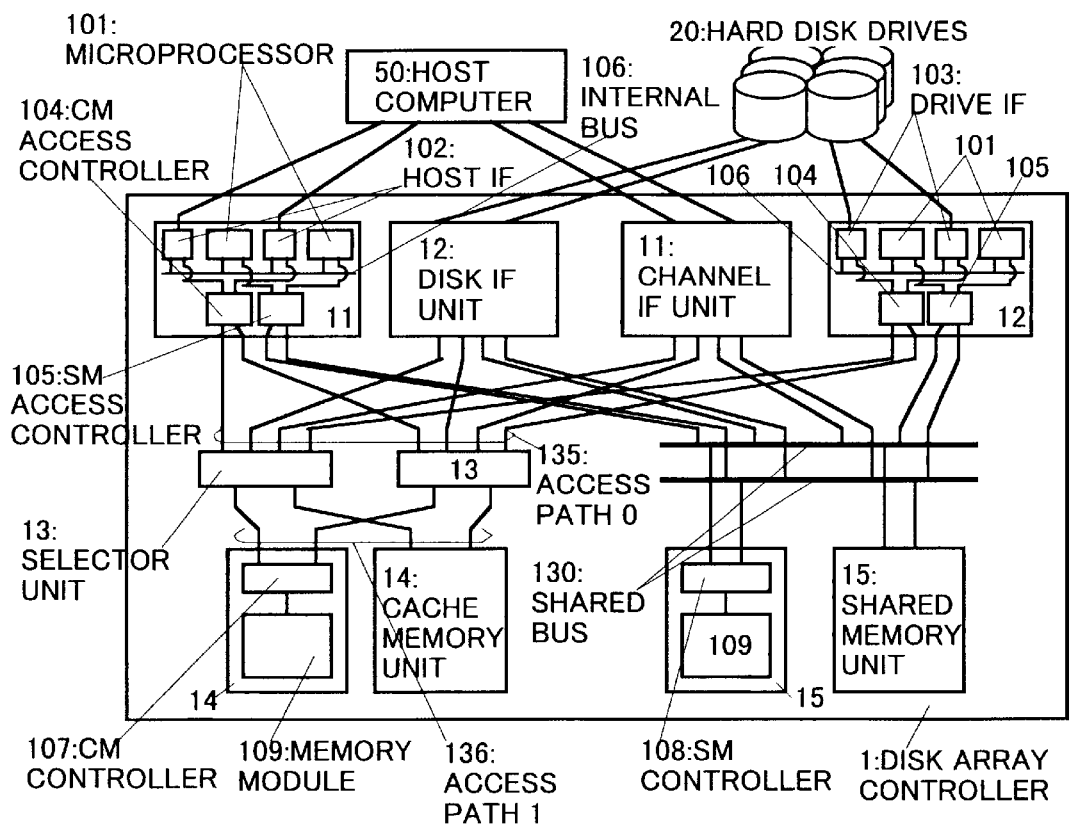
FIG. 17 is a diagram showing a configuration of a disk array controller in accordance with the invention.

Unlike the disk array controller 1 of the embodiment 1 shown in FIG. 1 with the access path 2:137 used to connect between the SM access control unit 105 and SM controller 108, two shared buses 130 are employed to connect therebetween as shown in FIG. 17. Provided from the SM access control unit 105 are connection paths each of which is for one of the two shared buses 130. Also provided from the SM controller 108 are connection paths, each for one of the two shared buses 130. The SM access control unit 105 and SM controller 108 have each two arbitors. Two arbitors are the arbitors for use in performing arbitration of two shared buses, respectively. When getting access to the SM controller 108 from the SM access control unit 105, one of a plurality of arbitors becomes the master for use in performing arbitration of the use right of shared bus 130. The SM access control unit 105 that has obtained the use right gets access to the SM controller 108. Optionally, in the alternative of providing such arbitors inside of the SM access control unit 105 and SM controller 108, these may be directly connected as independent circuitry to the shared buses 130 without suffering from any specific problems.

With the shared bus connection, widening the data width of buses makes it possible to increase data transfer rate, which in turn enables shortening of a time taken to give access to the shared memory units 15.

As has been described above, since the data width of the access path 2:137 in FIG. 1 can be made smaller than the data width of the access path 0:135 by twice or more, even when the star connection (one-to-one connection) is employed to connect between the channel IF units 11 and disk IF units 12 and the shared memory units 15 as shown in FIG. 1, problems will hardly occur as to the pin neck of an LSI for assembly of the shared memory units. Even in view of this, there still remains the possibility that an excessive increase in line number of access path 2:137 can result in creation of a problem that it is no longer possible to mount such access path 2:137. If this is the case, the shared bus connection of this embodiment will become effective.

It should be noted that although in this embodiment the selector unit 13 and cache memory unit 14 and shared memory unit 14 are each of duplicated configuration, the aforesaid effects are obtainable without use of such duplicated configuration.

According to the present invention, with regard to the access paths between the channel and disk IF units and cache memory, it is possible to make the throughput high. In addition, regarding the access paths between the channel and disk IF units and shared memory, the throughput can be made higher while shortening the access time. Thus, it becomes possible to provide the disk array control device that is high in throughput and yet short in response time.

What is claimed is:

1. A disk array control device comprising:
a plurality of channel interface units having an interface with a host computer;
a plurality of disk interface units having an interface with a magnetic disk device;
a cache memory unit for temporarily storing therein data being read/written with respect to said magnetic disk device; and
a shared memory unit for storage of control information as to data transmission between the channel interface units and disk interface units and said cache memory unit,
wherein each channel interface unit of said plurality of channel interface units executes data transfer between the interface with said host computer and said cache memory unit,
each disk interface unit of said plurality of disk interface units executes data transfer between the interface with said magnetic disk device and said cache memory unit, and
a connection system between said plurality of channel interface units and said plurality of disk interface units and said cache memory unit is different from a connection system between said plurality of channel interface units and said plurality of disk interface units and said shared memory unit.

2. The disk array control device according to claim 1, wherein said plurality of channel interface units and said plurality of disk interface units are connected via a selector unit to said cache memory unit, and wherein said plurality of channel interface units and said plurality of disk interface units are directly connected via no selector units to said shared memory unit.

3. The disk array control device according to claim 1, wherein said plurality of channel interface units and said plurality of disk interface units are connected via a selector unit to said cache memory unit, and wherein said plurality of channel interface units and said plurality of disk interface units are each connected to said shared memory unit on a one-to-one basis.

4. The disk array control device according to claim 1, wherein said plurality of channel interface units and said plurality of disk interface units are connected via a selector unit to said cache memory unit, and wherein said plurality of channel interface units and said plurality of disk interface units as well as said shared memory unit are connected to a shared bus.

5. The disk array control device according to claim 1, wherein said plurality of channel interface units and said plurality of disk interface units are connected to said cache memory unit via an interconnection network using a switch, and wherein said plurality of channel interface units and said plurality of disk interface units are each directly connected to said shared memory unit.

6. The disk array control device according to claim 1, wherein said plurality of channel interface units and said plurality of disk interface units are connected to said cache memory unit via an interconnection network using a switch, and wherein said plurality of channel interface units and said plurality of disk interface units are each connected to said shared memory unit on a one-to-one basis.

7. A disk array control device comprising:
a plurality of channel interface units having an interface with a host computer,
a plurality of disk interface units having an interface with a magnetic disk device,
a cache memory unit connected to said plurality of channel interface units and said plurality of disk interface units for temporarily storing therein data being read/written with respect to said magnetic disk device, and
a shared memory unit connected to said plurality of channel interface units and said plurality of disk interface units for storing therein control information as to data transfer between the channel interface units and disk interface units and said cache memory unit,
wherein a line number of an access path being connected to said cache memory unit is less than a line number of an access path as connected to said shared memory unit.

8. The disk array control device according to claim 7, comprising a selector unit,
wherein each channel interface unit of said plurality of channel interface units and each disk interface unit of said disk interface units are one-to-one connected by an access path to said selector unit respectively whereas said selector unit and said cache memory unit are connected by an access path, a total number of access paths for connection of each channel interface unit of said plurality of channel interface units and each disk interface unit of said plurality of disk interface units to said selector unit is greater than a total number of access paths for connection between said selector unit and said cache memory, and
each channel interface unit of said plurality of channel interface units and each disk interface unit of said disk interface units are each one-to-one connected by an access path to said shared memory unit.

9. A disk array control device comprising:
a plurality of interface units associated with a host computer,
a plurality of interface units associated with a magnetic disk device,
a physically independent cache memory unit for temporarily storing therein data of said magnetic disk device, and
a physically independent shared memory unit for storage of control information,
wherein each interface unit associated with said host computer and each interface unit with said magnetic disk device have respectively a microprocessor, a cache memory access control unit for controlling access to said cache memory unit, and a shared memory access control unit for controlling access to said shared memory unit, and wherein
each cache memory access control unit and said cache memory unit are connected together by an access path via a selector unit whereas each shared memory access control unit and said shared memory unit are directly connected together by an access path respectively.

10. A disk array control device comprising:
a plurality of interface units associated with a host computer,
a plurality of interface units associated with a magnetic disk device, a physically independent cache memory unit for temporarily storing therein data of said magnetic disk device, and a physically independent shared memory unit for storage of control information, wherein each interface unit with said host computer and each interface unit with said magnetic disk device have respectively a microprocessor, a cache memory access control unit for controlling access to said cache memory unit, and a shared memory access control unit for controlling access to said shared memory unit, and each cache memory access control unit and said cache memory unit are connected together via an interconnection network using a switch whereas each shared memory access control unit and said shared memory unit are directly connected together by an access path respectively.

11. The disk array control device according to claim 9, wherein a bandwidth of an access path between each cache memory access control unit and said cache memory unit is greater than or equal to twice of a maximal bandwidth between said host computer and the interface unit associated with said host computer.

12. The disk array control device according to claim 10, wherein a bandwidth of an access path between each cache memory access control unit and said cache memory unit is greater than or equal to twice of a maximal bandwidth between said host computer and the interface unit associated with said host computer.

13. A disk array control device comprising:

a plurality of channel interface units each having an interface associated with a host computer, a plurality of disk interface units each having an interface associated with a magnetic disk device, duplicated cache memory units connected respectively to said plurality of channel interface units and said plurality of disk interface units for temporarily storing therein data being read from and written into said magnetic disk device, and duplicated shared memory units connected respectively to said plurality of channel interface units and said plurality of disk interface units for storing therein control information as to data transfer between the channel interface units and disk interface units and said cache memory units, wherein a line number of an access path being connected to each cache memory unit of said duplicated cache memory units is less than a line number of an access path as connected to each shared memory unit of said duplicated shared memory units.

14. The disk array control device according to claim 13, comprising duplicated selector units, wherein each channel interface unit of said plurality of channel interface units and each disk interface unit of said disk interface units are one-to-one connected by access paths to said duplicated selector units respectively, each cache memory unit of said duplicated cache memory units and each selector unit of said duplicated selector units are connected by an access path on a one-to-one basis respectively, a total number of access paths for connection of each channel interface unit of said plurality of channel interface units and each disk interface unit of said plurality of disk interface units to each said duplicated selector unit is greater than a total number of access paths for connection between each cache memory unit of said duplicated cache memory units and each selector unit of said duplicated selector units, and each channel interface unit of said plurality of channel interface units and each disk interface unit of said disk interface units are each one-to-one connected by an access path to each said duplicated shared memory unit.

* * * * *